United States Patent
Shimizu et al.

(10) Patent No.: US 10,483,508 B2
(45) Date of Patent: Nov. 19, 2019

(54) WIRING MODULE

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Hiroshi Shimizu, Yokkaichi (JP); Hiroki Hirai, Yokkaichi (JP); Tetsuji Tanaka, Yokkaichi (JP); Ryouya Okamoto, Yokkaichi (JP); Hitoshi Takeda, Yokkaichi (JP)

(73) Assignees: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-Shi, Osaka (JP)

( * ) Notice: Subject to any disclaimer, the term of this patent is extended or adjusted under 35 U.S.C. 154(b) by 102 days.

(21) Appl. No.: 15/755,416

(22) PCT Filed: Aug. 31, 2016

(86) PCT No.: PCT/JP2016/075409
§ 371 (c)(1),
(2) Date: Feb. 26, 2018

(87) PCT Pub. No.: WO2017/047382
PCT Pub. Date: Mar. 23, 2017

(65) Prior Publication Data
US 2018/0254442 A1 Sep. 6, 2018

(30) Foreign Application Priority Data
Sep. 16, 2015 (JP) .................. 2015-182768

(51) Int. Cl.
*H01M 2/10* (2006.01)
*H01M 2/20* (2006.01)
(Continued)

(52) U.S. Cl.
CPC ....... *H01M 2/1077* (2013.01); *H01M 2/1061* (2013.01); *H01M 2/202* (2013.01);
(Continued)

(58) Field of Classification Search
CPC .. H01M 2/1077; H01M 2/206; H01M 2/1061; H01M 2/202; H01M 2220/20;
(Continued)

(56) References Cited

U.S. PATENT DOCUMENTS 3,127,021 A * 3/1964 Nolen .................. A47B 45/00
211/175
5,857,650 A * 1/1999 Lin ......................... A47B 9/14
248/188.5
(Continued)

FOREIGN PATENT DOCUMENTS

| JP | 2011091003 A | 5/2011 |
|----|--------------|--------|
| JP | 2011124176 A | 6/2011 |

(Continued)

OTHER PUBLICATIONS

Machine English translation of JP 2011-091003 (Year: 2011).*
(Continued)

*Primary Examiner* — Michael L Dignan
(74) *Attorney, Agent, or Firm* — Reising Ethington, P.C.

(57) ABSTRACT

In a battery wiring module that is to be attached from a Y-axis direction (second direction) to a single battery group in which multiple single batteries that have electrode terminals are aligned in the X-axis direction (first direction), multiple holding units that are coupled in the X-axis direction and constitute a holding plate are each provided with a
(Continued)

locking hook including a first locking surface and a second locking surface, and a locked hook that includes a first locked surface and a second locked surface, and by relatively sliding the holding units in the X-axis direction, the holding units can be coupled in a first locking state in which the first locked surface is locked to the second locking surface, or in a second locking state in which the first locked surface is locked to the first locking surface of the locking hook and the second locked surface is locked to the second locking surface.

6 Claims, 13 Drawing Sheets

(51) Int. Cl.
*H01R 11/11* (2006.01)
*H01R 24/00* (2011.01)
*H01M 2/02* (2006.01)
*H01R 25/16* (2006.01)

(52) U.S. Cl.
CPC ............ *H01R 11/11* (2013.01); *H01R 24/00* (2013.01); *H01M 2/0262* (2013.01); *H01R 25/16* (2013.01)

(58) Field of Classification Search
CPC ...... H01M 2/0262; H01R 24/00; H01R 11/11; H01R 25/16
See application file for complete search history.

(56) References Cited

U.S. PATENT DOCUMENTS

| | | | | |
|---|---|---|---|---|
| 7,258,652 | B2* | 8/2007 | Florio | A63B 25/00 135/65 |
| 8,220,086 | B2* | 7/2012 | Geiger | A47C 19/02 5/201 |
| 9,166,087 | B2* | 10/2015 | Chihlas | H02S 20/23 |
| 2012/0328920 | A1 | 12/2012 | Takase et al. | |
| 2014/0072861 | A1* | 3/2014 | Nakayama | H01M 2/202 429/158 |
| 2014/0113494 | A1 | 4/2014 | Kinoshita et al. | |
| 2014/0134894 | A1* | 5/2014 | Kinoshita | H01M 2/1077 439/754 |
| 2015/0001357 | A1* | 1/2015 | Jaffari | H02G 3/128 248/201 |

FOREIGN PATENT DOCUMENTS

| | | |
|---|---|---|
| JP | 2013105571 A | 5/2013 |
| JP | 2013161749 A | 8/2013 |

OTHER PUBLICATIONS

Machine English translation of JP 2011-124176 (Year: 2011).*
International Preliminary Report on Patentability for Application No. PCT/JP2016/075409 dated Mar. 21, 2017; 6 pages.
International Search Report for Application No. PCT/JP2016/075409 dated Oct. 25, 2016; 5 pages.

* cited by examiner

WIRING MODULE

CROSS REFERENCE TO RELATED APPLICATIONS

This application claims the priority of Japanese patent application JP2015-182768 filed on Sep. 16, 2015, the entire contents of which are incorporated herein.

TECHNICAL FIELD

The technique disclosed in the present specification relates to a wiring module.

BACKGROUND ART

A wiring module in which many power storage elements are arrayed horizontally in order to increase output is known as a wiring module for an electric automobile or a hybrid car. In this kind of power storage module, multiple power storage elements are connected in series or in parallel by connecting electrode terminals of adjacent power storage elements with connection members such as bus bars.

Incidentally, upon arraying the multiple power storage elements in the power storage module, an attachment tolerance is set between the adjacent power storage elements, and therefore the pitch between the electrode terminals formed in the power storage elements shifts in some cases. In view of this, with the wiring module disclosed in Patent Document 1 (JP2013-105571A), for example, it is possible to handle not only the attachment tolerance, but also pitch shifting caused by expansion, contraction, and the like of the power storage elements by holding the connection members such that they can move in the alignment direction of the power storage elements (single batteries) in holding portions of a connection plate.

SUMMARY

On the other hand, in the power storage module, another member such as a reinforcing plate or a heat dissipation plate is interposed between the power storage elements in order to ensure strength, dissipate heat, and the like. In such a case, the pitch between the electrode terminals cannot be dealt with using a technique of adjusting the holding positions of the connection members of the above-described connection plate since the pitch at the location where the other member is interposed significantly varies from that at other locations, and thus a connection plate with a dedicated shape has been needed.

The technique disclosed in the present specification has been completed based on the foregoing circumstance, and aims to provide a wiring module that can deal with significant changes in the pitch between adjacent electrode terminals, and that enables various wiring module designs.

As a solution to the above-described problem, the present specification discloses a wiring module to be attached to a power storage element group in which a plurality of power storage elements having positive and negative electrode terminals are aligned in a first direction, the wiring module configured to be attached from a second direction orthogonal to the first direction, including: connection members to be connected to the electrode terminals; and a plurality of holding units that are coupled in the first direction and hold the connection members, wherein the holding units are each provided with a locking portion that locks and couples a holding unit adjacent to the holding unit, and a locked portion that is locked to the locking portion of a holding unit adjacent to the holding unit, and the holding units each include a plurality of at least one of the locking portion and the locked portion and are configured such that an interval between the adjacent holding units can be changed in a stepwise manner.

According to the above-described wiring module, by changing the coupling state of the holding units, it is possible to change the interval between the holding units, and therefore holding units that are used in common with other portions can be used also at a portion at which the interval between the power storage elements differs significantly from other portions in the power storage element group. Note that in the present embodiment, "changeable in a step-wise manner" refers to being able to couple the holding units at different intervals by selecting the locking portion and locked portion to be used in the coupling of the holding units as necessary from among the multiple locking portions and locked portions included in the holding units.

As a result, the holding units can be used in common, and a cost reduction effect is obtained. Also, it is easier to deal with changes in the intervals between the power storage elements and various designs of the power storage module are possible.

A plurality of at least one of the locking portion and the locked portion may be provided in alignment in the first direction on the wiring module.

With the above-described configuration, the locking portion or locked portion that is arranged at the appropriate position is selected from among the locking portions or locked portions provided in alignment in the first direction, and is locked with the locked portion or locking portion, and thus the interval between the holding units can be adjusted.

In the above-described wiring module, the locked portion of the holding unit may also be able to be locked to the locking portion of the holding unit adjacent to the holding unit by sliding along the first direction.

With the above-described configuration, the locking portions and the locked portions to be used in the coupling of the holding units can be changed in a step-wise manner by changing the slide width at the time of locking the holding units together by sliding.

As a result, the coupling width of the holding units can be adjusted very easily so as to match the interval between the power storage elements, which makes it easier to manufacture the wiring module, and consequently, to manufacture the power storage module.

Alternatively, in the above-described wiring module, the locked portion of the holding unit may also be locked by being pressed in the second direction into the locking portion of the holding unit adjacent to the holding unit.

With this type of configuration, a wiring module in which the holding units can be coupled at a desired coupling width can be manufactured by causing the appropriate locked portion of the holding unit to oppose the appropriate locking portion of the holding unit adjacent thereto and pressing the locked portion in the second direction.

As a result, even if the work space is small and there is no room to slide the holding units relative to each other in the first direction, the coupling width of the holding units can be easily adjusted. Also, a wiring module in which the holding units are coupled at an appropriate interval can be manufactured and attached to the power storage element group installed at a predetermined location.

According to the technique disclosed in the present specification, it is possible to provide a power storage module that

DESCRIPTION OF EMBODIMENTS

First Embodiment

Figure 1:
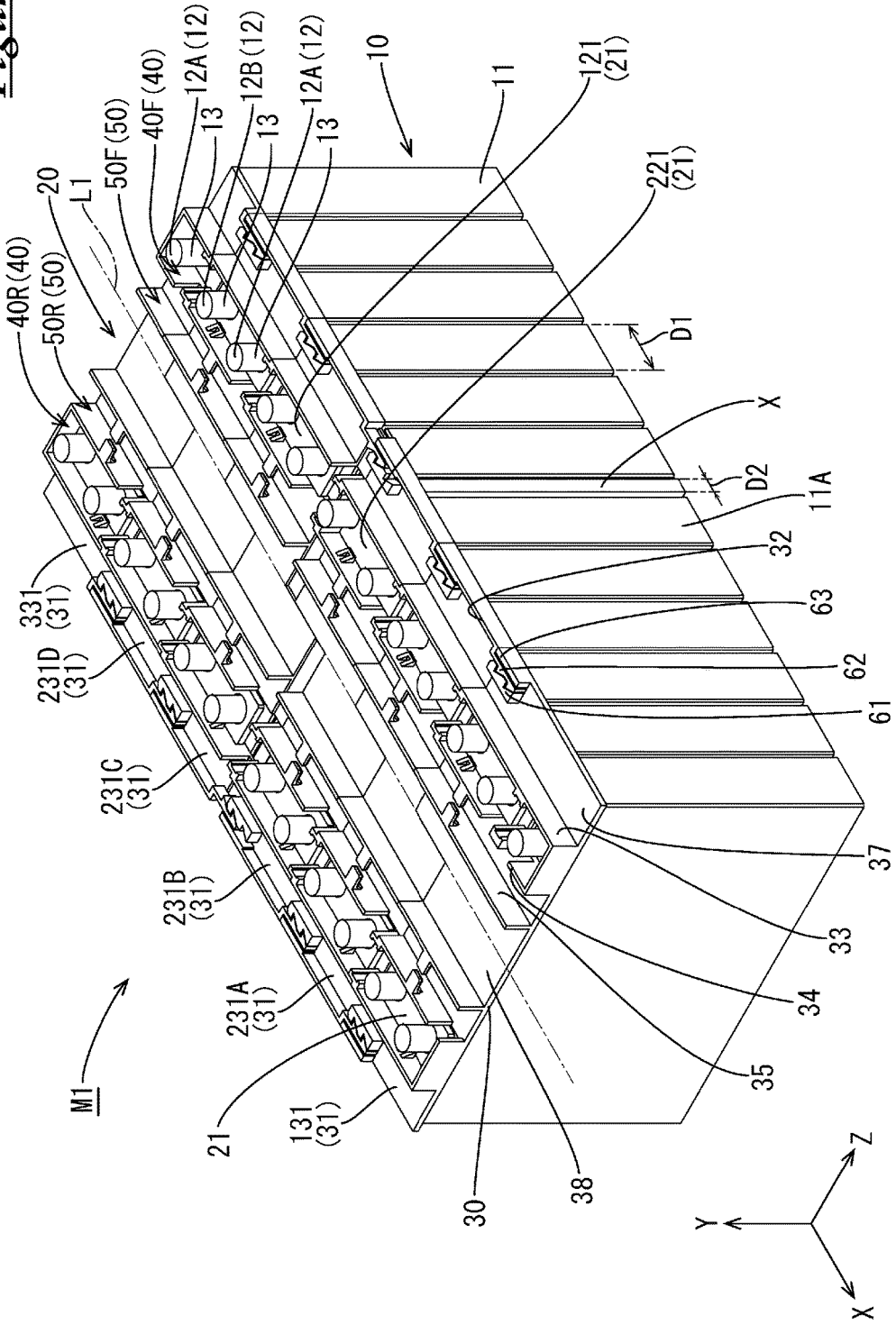
FIG. 1 is a diagram showing an external view of a battery module according to a first embodiment.

A first embodiment will be described with reference to FIGS. 1 to 6. As shown in FIG. 1, a battery wiring module 20 according to the present embodiment is attached to a single battery group 10 (power storage element group) formed by aligning multiple (in the present embodiment, twelve) single batteries 11 (examples of power storage modules) that include positive and negative electrode terminals 12.

A battery module M1 (power storage module) formed by attaching the battery wiring module 20 of the present embodiment to the single battery group 10 is used as a driving source for a vehicle (not shown) such as an electric automobile or a hybrid automobile, for example. The multiple single batteries 11 that constitute the single battery group 10 are connected in series by the battery wiring module 20 due to the positive electrode terminals 12A and the negative electrode terminals 12B of the different single batteries 11 being electrically connected. Hereinafter, the near side on the left in FIG. 1 is set as left (the far side on the right is set as right), the upper side is set as up (the lower side is set as down), the front side on the right is set as front (the far side on the left is set as rear), the left-right direction is set as the X-axis direction, the up-down direction is set as the Y-axis direction, the front-rear direction is set as the Z-axis direction, and direction lines are added to the drawings.

As shown in FIG. 1, a single battery 11 has a cuboid shape that is flat in the X-axis direction, and has a positive electrode terminal 12A and a negative electrode terminal 12B formed on its upper surface. Hereinafter, the thickness in the X-axis direction of the single battery 11 is denoted as D1. Also, the positive electrode terminal 12 is denoted as "cathode terminal 12A", the negative electrode terminal 12 is denoted as "anode terminal 12B", and when these are referred to collectively, "electrode terminal 12" is used. An electrode terminal 12 includes a pedestal (not shown) composed of a metal member and an electrode post 13 that protrudes upward from the pedestal in the form of a circular rod. The electrode posts 13 are inserted into through holes 23 (see FIG. 2) of later-described bus bars 21 (examples of connection members), and the electrode posts 13 and the bus bars 21 are fixed by fixing members (not shown).

As shown in FIG. 1, the single batteries 11 are aligned in the X-axis direction such that the polarities of the electrode terminals 12 of the adjacent single batteries 11 are different (such that the cathode terminals 12A and the anode terminals 12B are arranged alternatingly), and the single batteries 11 are fixed by holding tools (not shown), thereby constituting the single battery group 10. That is, in the present embodiment, the X-axis direction is a first direction.

In the present embodiment, a reinforcing plate X for improving the strength of the single battery group 10 is inserted in the center of the single battery group 10 aligned in the X-axis direction (between the sixth single battery 11 and the seventh single battery 11 from the left end). Hereinafter, the thickness in the X-axis direction of the reinforcing plate X is denoted as "D2". Also, if necessary in the following description, among the twelve single batteries 11, the sixth single battery 11 from the left end, which is arranged on the left side of the reinforcing plate X, is denoted as "single battery 11A", and the seventh single battery 11 from the left end, which is arranged on the right side of the reinforcing plate X, is denoted as "single battery 11B".

As shown in FIG. 1, the battery wiring module 20 is attached to the upper surface of the single battery group 10 (electrode terminal surface) from above in the Y-axis direction. That is, in the present embodiment, the Y-axis direction is a second direction.

The battery wiring module 20 includes multiple bus bars 21 that are connected to the electrode terminals 12 of the single batteries 11 and multiple holding units 31 that are made of synthetic resin and hold the bus bars 21. The holding units 31 are coupled in the X-axis direction to form the holding plate 30. As shown in FIG. 1, the holding plate 30 is rectangular in a top view. Hereinafter, the center line of the holding plate 30 that extends in the X direction is denoted as "axis L1", and if necessary in the following description, the suffix "F" is added to the reference numerals of elements arranged frontward with respect to the axis L1, the suffix "R" is added to the reference numerals of elements arranged rearward with respect to the axis L1, and when these are referred to collectively with no distinction made therebetween, no suffix is added.

The holding plate 30 is composed of multiple (in the present embodiment, six) holding units 31 that are aligned in the X-axis direction and are coupled to each other. The coupling structure of the holding units 31 will be described later.

Figure 2:
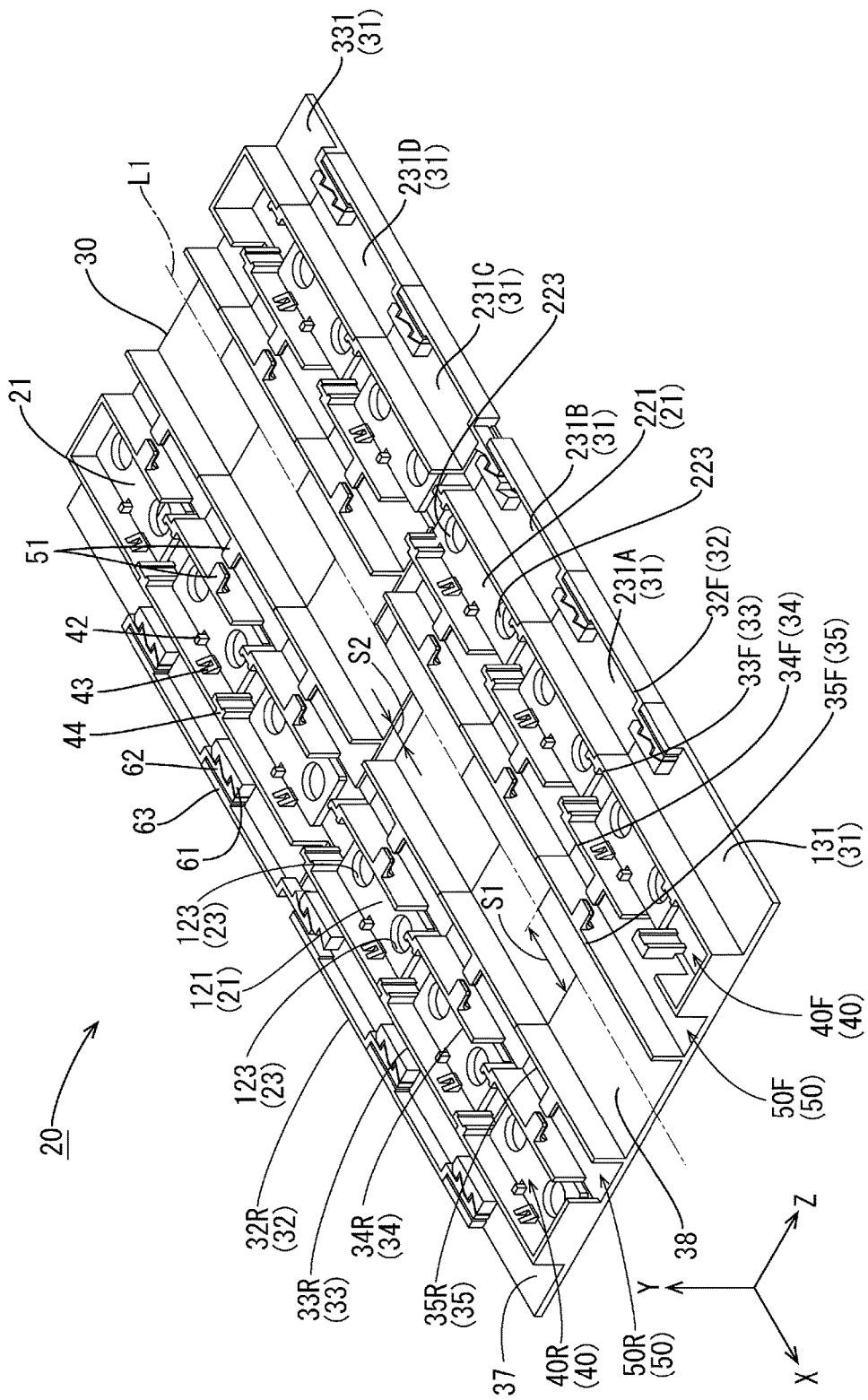
FIG. 2 is a perspective view of a holding plate in which connection members are arranged.

The holding units 31 are composed of an insulating resin material. As shown in FIG. 2 and the like, on the upper surfaces of the holding units 31 according to the present embodiment, a pair of coupling walls 32 are provided in a protruding manner in the X-axis direction along the front edges and the rear edges, and holding walls 33, boundary walls 34, and groove walls 35 are formed parallel thereto in the stated order from the coupling walls 32 toward the axis L1. The region between the holding wall 33F and the boundary wall 34F on the front side and the region between the holding wall 33R and the boundary wall 34R on the rear side are set as holding regions 40 (40F, 40R) in which the later-described bus bars 21 (types of connection members)

are held, and the region between the boundary wall 34F and the groove wall 35F on the front side and the region between the boundary wall 34R and the groove wall 35R are set as wire storing grooves 50 (50F, 50R) in which the wires connected to the bus bars 21 and the like are stored. Note that other than the bus bars 21, members such as detection terminals may be held in the holding regions 40. Also, multiple wires can be stored in the wire storing grooves 50.

Although the height dimensions of the holding walls 33, the boundary walls 34, and the groove walls 35 are not shown in detail, they are set such that in the state in which the battery wiring module 20 is attached to the single battery group 10, the upper end portions thereof are higher than the upper end portions of the electrode terminals 12. Accordingly, it is possible to reduce the likelihood that a tool or the like will come into contact with the electrode terminal 12 and the cathode terminal 12A and the anode terminal 12B will be short-circuited via the tool or the like. Note that the coupling walls 32 are formed with a height dimension that is lower than that of the holding walls 33 and the like.

Bottom walls 37 are included in the region between the coupling wall 32F and the holding wall 33F on the front side and the region between the coupling wall 32R and the holding wall 33R on the rear side. Also, a bottom wall 38 is formed in the region that includes the wire storing grooves 50F and 50R and spans from the boundary wall 34F on the front side to the boundary wall 34R on the rear side. In other words, in the holding plate 30, only the holding regions 40F and 40R do not include bottom walls and are open downward.

The holding units 31 according to the present embodiment are composed of a first holding unit 131 arranged on the left end, a third holding unit 331 arranged on the right end, and four second holding units 231 that are arranged between the first holding unit 131 and the third holding unit 331. Hereinafter, the second holding units 231, the first holding unit 131, and the third holding unit 331 will be described in the stated order.

In the holding plate 30 according to the present embodiment, the four second holding units 231 coupled in alignment in the central portion in the X-axis direction have identical structures. In the following description, if it is necessary to make a distinction between the four second holding units 231, second holding units 231A, 231B, 231C, and 231D are used in the stated order starting from the left.

Figure 3:
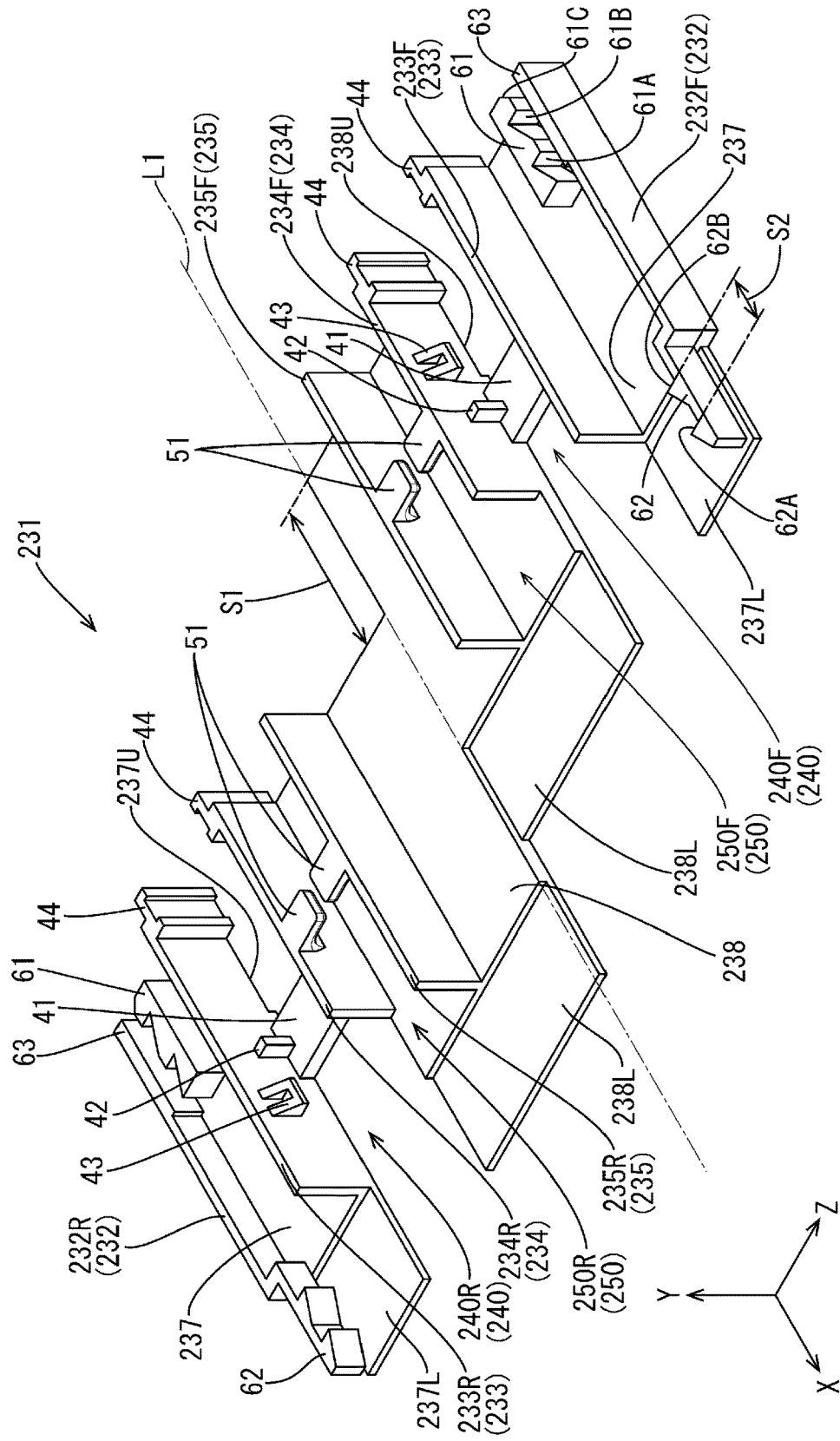
FIG. 3 is a perspective view of a second holding unit.

As shown in FIG. 3, the second holding unit 231 has a structure that is linearly symmetrical with respect to the axis L1 and has an outline obtained due to the front side portion being shifted rightward by a predetermined length S1 with respect to the rear end portion along the axis L1. Note that S1 is set so as to be approximately equal to the thickness D1 of the single battery 11 (see FIGS. 1 and 2). Two coupling wall portions 232 are provided extending along the front edge and the rear edge on the upper surface of the second holding unit 231, and in parallel to these, holding wall portions 233, boundary wall portions 234, and groove wall portions 235 are formed in the stated order from the coupling wall portions 232 toward the axis L1.

In the state in which the holding units 31 are coupled, the coupling wall portions 232, the holding wall portions 233, the boundary wall portions 234, and the groove wall portions 235 are continuous and respectively form portions of the coupling walls 32, the holding walls 33, the boundary walls 34, and the groove walls 35.

The region between the coupling wall portion 232F and the holding wall portion 233F on the front side, and the region between the coupling wall portion 232R and the holding wall portion 233R on the rear side include bottom wall portions 237, and upper thin bottom portions 237U with shapes obtained by thinly cutting the lower surfaces are formed with a certain area on the right end portions of the bottom wall portions 237, and lower thin bottom portions 237L with shapes obtained by cutting the upper surfaces are formed with a certain area on the left end portions. The upper thin bottom portion 237U and the lower thin bottom portion 237L are formed such that the thickness obtained by overlaying the two is approximately equal to the thickness of the other parts of the bottom wall portions 237.

In the state in which the holding units 31 are coupled, the upper thin bottom portions 237U overlap with the lower thin bottom portions 237L or with the lower thin bottom portions 337L of the later-described third holding unit 331, and the lower thin bottom portions 237L overlap with the upper thin bottom portions 237U or the upper thin bottom portions 137U of the later-described first holding unit 131, thus forming parts of the bottom wall 37.

The left end portions of the coupling wall portions 232 are bent in a stepwise shape so as to approach the axis L1, and are provided with locked hooks 62 that have horizontal cross sections with shapes obtained by connecting two half arrows. The above-described lower thin bottom portions 237L are provided below the locked hooks 62, the lower surfaces of the locked hooks 62 and the upper surfaces of the lower thin bottom portions 237L are separated from each other, and the locked hooks 62 have cantilever shapes with base ends on the right side. On the other hand, thick portions 63 that conform to the level differences of the locked hooks 62 are formed on the right end portions of the coupling wall portions 232 and locking hooks 61 are provided in a standing manner on the portions near the axis L1 with respect to the thick portions 63 on the upper surfaces of the upper thin bottom portions 237U so as to oppose the thick portions 63. The locking hooks 61 have shapes that engage with the locked hooks 62 and are formed such that the locked hooks 62 can be locked by sliding between the locking hooks 61 and the thick portions 63.

The region between the holding wall portion 233F and the boundary wall portion 234F on the front side and the region between the holding wall portion 233R and the boundary wall portion 234R on the rear side are set as holding portions 240 (240F, 240R) that hold the later-described bus bars 21. The holding portion 240F on the front side of the second holding unit 231 is shifted leftward by S1 with respect to the holding portion 240R on the rear side, and the bus bars 21 held therein connect different single batteries 11. Accordingly, the alignment state of the single batteries 11 and the holding units 31 is easy to keep favorable.

Figure 6:
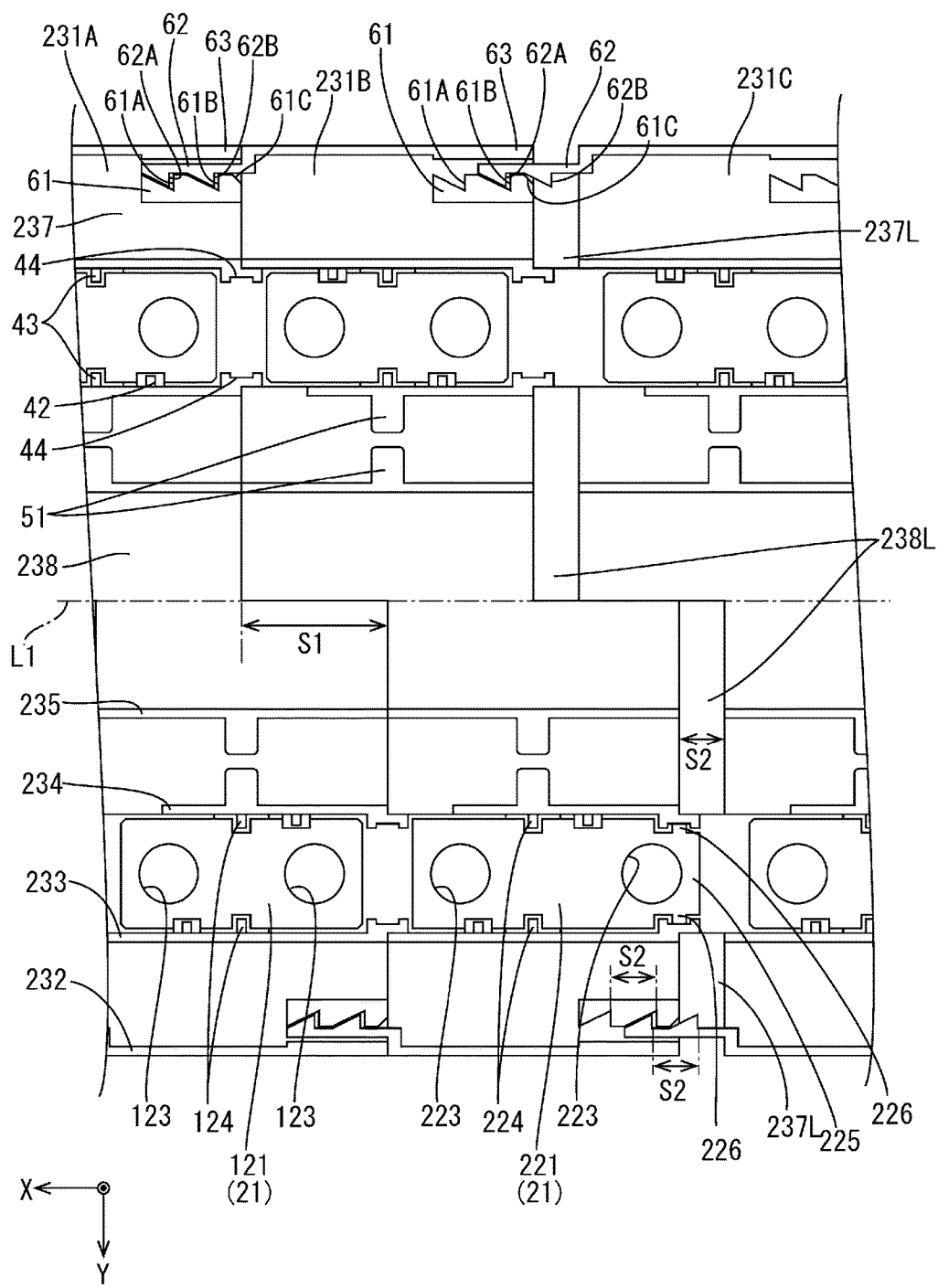
FIG. 6 is an enlarged plan view of coupling portions of the holding plate.

The holding portions 240 are formed in the Z-axis direction such that mounting portions 41 for mounting the bus bars 21 span between the lower surfaces of the holding surface portions 233 and the lower surfaces of the boundary wall portions 234. The holding portions 240 of the second holding units 231 are given a size according to which approximately one later-described bus bar 21 is contained, and have a form of being open in the X-axis direction and the Y-axis direction. As shown in FIG. 6 as well, positioning protrusions 42 that restrict movement of the bus bars 21 in the X-axis direction are provided in a protruding manner on the upper surfaces of the mounting portions 41 so as to oppose the holding wall portions 233 and the boundary wall portions 234. Also, pressing protrusions 43 that are aligned with the positioning protrusions 42 and restrict movement of the bus bars 21 in the Y-axis direction are provided so as to protrude from the holding wall portions 233 and the boundary wall portions 234. On the right end portions of the holding wall portions 233 and the boundary wall portions 234, intermediate protrusions 44 with approximately U-shaped horizontal cross sections are provided extending in the Y-axis direction so as to oppose each other.

In the state in which the holding units 31 are coupled, the holding portions 240 are linked to the other holding portions 240, the holding portions 140 of the later-described first holding unit 131, or the holding portions 340 of the third holding unit 331, and thus form parts of the holding regions 40. The coupling wall portions 232, the holding wall portions 233, and the groove wall portions 235 are formed spanning over the entire length in the X-axis direction of the bottom wall portions 237 and 238 excluding the lower thin bottom portions 237L and 238L, and the boundary wall portions 234 are formed with their left ends slightly held back. Accordingly, in the state in which multiple holding units 31 are coupled, cut-out portions (openings) are formed on the boundary walls 34. Through the cut-out portions, wires connected to the bus bars 21 or the like held in the holding regions 40 can be pulled out to the later-described wire storing grooves 50.

The region between the boundary wall portion 234F and the groove wall portion 235F on the front side and the region between the boundary wall portion 234R and the groove wall portion 235R on the rear side are set as wire storing portions 250 (250F, 250R) for storing wires connected to the bus bars 21 stored in the storing regions 40. From the upper ends of the boundary wall portions 234 and the groove wall portions 235, retaining pieces 51 that prevent sticking out of the wires stored in the interior protrude so as to oppose each other. The bottom wall portion 238 is formed in the region that includes the wire storing portions 250F and 250R and spans from the boundary wall portion 234F on the front side to the boundary wall portion 234R on the rear side. Upper thin bottom portions 238U with shapes obtained by cutting the lower surface are formed on the right end portions of the bottom wall portion 238 and lower thin bottom portions 238L with shapes obtained by cutting the upper surface are formed on the left end portions. The upper thin bottom portions 238U and the lower thin bottom portions 238L are formed such that the thickness obtained by overlaying the two is approximately equal to the thickness of the other parts of the bottom wall portions 238.

In the state in which the holding units 31 are coupled, the wire storing portions 250 are linked to the other wire storing portions 250, or the wire storing portion 150 of the later-described first holding unit 131 or the wire storing portion 350 of the third holding unit 331, whereby parts of the wire storing grooves 50 are formed. Also, in the state in which the holding units 31 are coupled, the upper thin bottom portions 238U overlap with the lower thin bottom portions 238L or the lower thin bottom portions 338L of the later-described third holding unit 331, and the lower thin bottom portions 238L overlap with the upper thin bottom portions 237U or the upper thin bottom portions 138U of the later-described first holding unit 131, whereby parts of the bottom walls 38 are formed.

Figure 4:
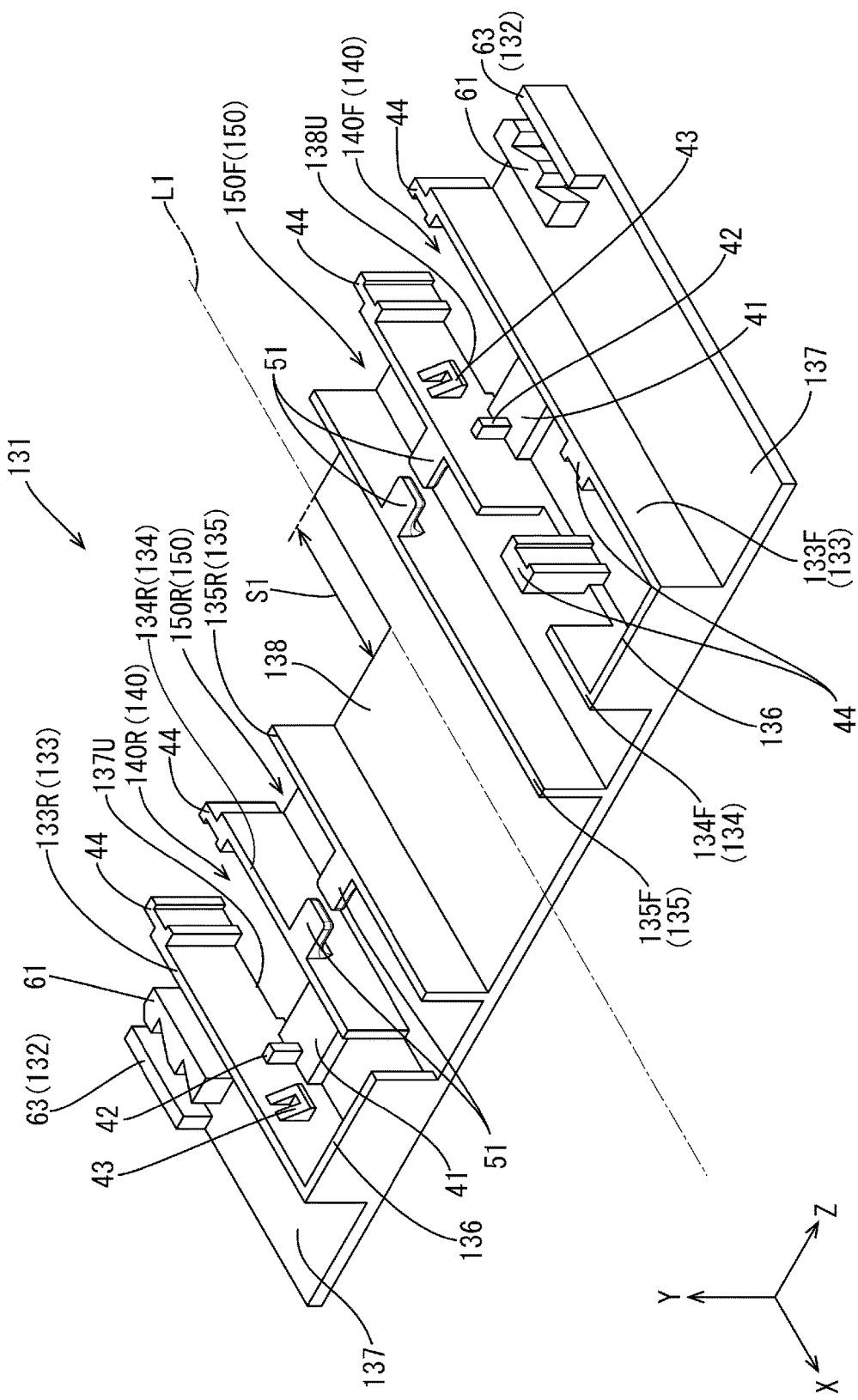
FIG. 4 is a perspective view of a first holding unit.

As shown in FIG. 4, the first holding unit 131 arranged on the left end in the holding plate 30 according to the present embodiment is formed so as to have an outline with a stepwise shape that descends to the right in plan view, in which the left edge is straight, and the portion on the front side with respect to the axis L1 is extended rightward by a predetermined length S1 with respect to the portion on the rear side. The first holding unit 131 has bottom wall portions 137 and 138, which correspond to the bottom wall portions 237 and 238 of the second holding unit 231, and on its upper surface, holding wall portions 133, boundary wall portions 134, and groove wall portions 135, which similarly correspond to the holding wall portions 233, the boundary wall portions 234, and the groove wall portions 235, are formed.

Upper thin bottom portions 137U having shapes obtained by cutting the lower surface are formed on the right end portions of the bottom wall portions 137. Also, coupling wall portions 132 are set as thick portions 63 that conform to the level differences of the locked hooks 62 formed on the above-described second holding unit 232, and locking hooks 61 are provided in a standing manner on the upper surfaces of the upper thin bottom portions 137U.

The region between the holding wall portion 133F and the boundary wall portion 134F on the front side and the region between the holding wall portion 133R and the boundary wall portion 134R on the rear side are set as holding portions 140 (140F, 140R) that hold later-described bus bars 21. Side wall portions 136 are provided extending in the Z direction on the left edges of the holding portions 140, the left-side ends of the holding portions 140 are closed due to being connected to the left edges of the holding wall portions 133 and the like, and the holding portions 140F and 140R have a form in which both are open in the rightward direction and the Y-axis direction. Also, the holding portion 140R on the rear side is set to a size according to which approximately one later-described general-purpose bus bar 121 is stored, and the holding portion 140F on the front side is set to a size according to which an interval of a predetermined length 51 occurs between a general-purpose bus bar 121 and the side wall portion 136F on the front side in a state in which one general-purpose bus bar 121 is stored in the portion toward the right. Also, the holding portions 140 are provided with mounting portions 41, positioning protrusions 42, pressing protrusions 43, and intermediate protrusions 44.

The region between the boundary wall portion 134F and the groove wall portion 135F on the front side and the region between the boundary wall portion 134R and the groove wall portion 135R on the rear side are set as wire storing portions 150 (150F, 150R) for storing wires connected to members such as the bus bars 21 held in the holding regions 40. Upper thin bottom portions 138U with shapes obtained by cutting the lower surface are formed on the right end portions of the bottom wall portions 138, and the wire storing portions 150 are provided with retaining pieces 51.

Figure 5:
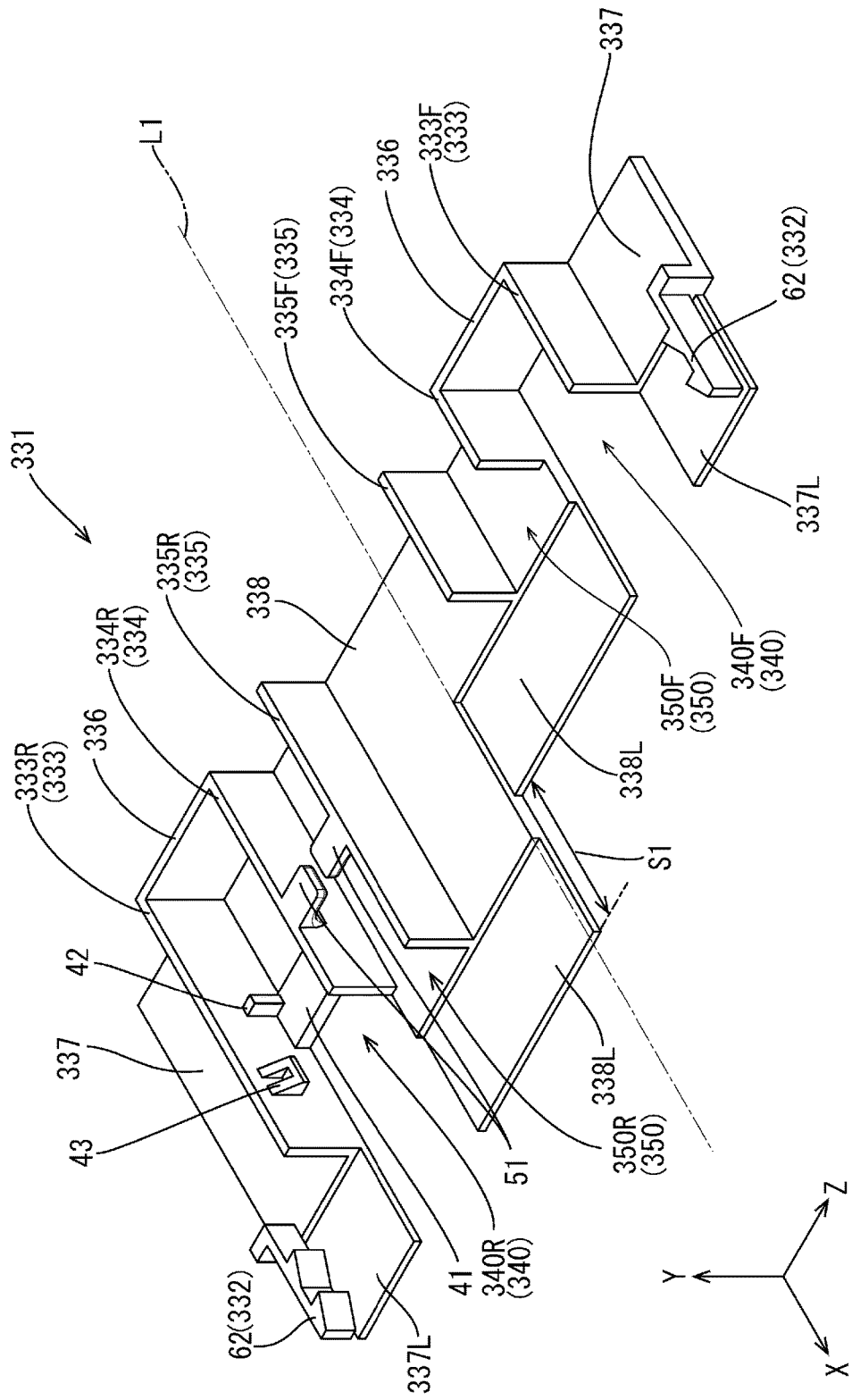
FIG. 5 is a perspective view of a third holding unit.

As shown in FIG. 5, the third holding unit 331 arranged on the right end in the holding plate 30 according to the present embodiment is formed so as to have a stepwise outline in a top view, in which the right edge is straight and the portion of the left edge that is rearward of the axis L1 is extended leftward by a predetermined length S1 with respect to the front-side portion. The third holding unit 331 has bottom wall portions 337 and 338, which correspond to the bottom wall portions 237 and 238 of the second holding unit 231, and on its upper surface, holding wall portions 333, boundary wall portions 334, and groove wall portions 335, which similarly correspond to the holding wall portions 233, the boundary wall portions 234, and the groove wall portions 235, are formed.

Lower thin bottom portions 337L with shapes obtained by cutting the upper surface are formed on the left end portions of the bottom wall portions 337. Also, the coupling wall portions 332 formed on the upper surfaces of the lower thin bottom portions 337L are set as cantilever-shaped locked hooks 62 whose right sides are their base ends.

The region between the holding wall portion 333F and the boundary wall portion 334F on the front side and the region between the holding wall portion 333R and the boundary wall portion 334R on the rear side are set as holding portions 340 (340F, 340R) that form parts of the holding regions 40 that hold the later-described bus bars 21. On the right edge of the holding portion 340, side wall portions 336 are provided extending in the Z-axis direction and connect to the right edges of the holding wall portions 333 and the boundary wall portions 334, whereby the right-side ends of the holding portions 340 are closed, and the holding portions 340F and 340R have forms in which both are open in the leftward direction and the Y-axis direction. Also, the holding portion 340R on the rear side is set to a size according to which approximately one later-described general-purpose bus bar 121 is stored, the length in the left-right direction of the holding portion 340F on the front side is set to be approximately equal to the predetermined length S1, and no bus bar 21 is stored in the holding portion 340F. The holding portion 340R on the rear side is provided with a mounting portion 41, positioning protrusions 42, and pressing protrusions 43.

The region between the boundary wall portion 334F and the groove wall portion 335F on the front side and the region between the boundary wall portion 334R and the groove wall portion 335R on the rear side are set as wire storing portions 350 (350F, 350R) for storing wires connected to members such as the bus bars 21 stored in the storing regions 40. Lower thin bottom portions 338L with shapes obtained by cutting the upper surface are formed on the left end portions of the bottom walls 338, and the wire storing portion 350R on the rear side is provided with retaining pieces 51.

Next, the coupling structures of the first holding unit 131, the second holding unit 231, and the third holding unit 331, which constitute the holding plate 30 according to the present embodiment will be described.

As described above, locked hooks 62 that have a horizontal cross section with an outline obtained by connecting two half arrows are formed in cantilever shapes whose right sides are their base ends on the left end portions of the coupling wall portions 232 and 332, which are provided in a standing manner on the second holding units 231 and the third holding unit 331. More specifically, as shown in FIGS. 3 and 6, the locked hooks 62 include first locked surfaces 62A (locked portions) that are formed orthogonally to the X-axis direction on the arrowhead base portions on the left side, and second locked surfaces 62B (locked portions) that are similarly formed orthogonally to the X-axis direction on the arrowhead base portions on the right side.

On the other hand, the thick portions 63 are formed on the right end portions of the coupling wall portions 132 and 232 provided in a standing manner in the first holding unit 131 and the second holding units 231, and the locking hooks 61 are provided in a standing manner so as to oppose the thick portions 63 on the axis L1 side of the thick portions 63 of the bottom wall portions 137, 237, and 337. The interval between the thick portion 63 and the locking hook 61 is set to a size according to which it is possible to insert the locked hooks 62 by sliding. As shown in FIGS. 3 and 6, the locking hooks 61 include first locking surfaces 61A (locking portions) that are formed orthogonally to the X-axis direction, and second locking surfaces 61B (locking portions) that are similarly formed orthogonally to the X-axis direction on the right side thereof, the corner portions on the thick portion side of the right ends are chamfered, and cut-out inclined portions 61C are formed.

In order to couple the holding units 31, the locked hooks 62 are pressed from rightward between the thickness portion 63 and the locking hooks 61 while the inclined surfaces on the left tips of the locked hooks 62 are aligned with the cut-out inclined portions 61C on the right ends of the locking hooks 61. Upon doing so, as a first stage, the first locked surfaces 62A are coupled and locked in a state of coming into contact with the second locking surfaces 61B of the locking hooks 61 from leftward in FIG. 6 (first locking state). From this state, in a second stage, when the locked hooks 62 are further pressed leftward, they are coupled and locked in a state in which the first locked surfaces 62A are in contact with the first locking surfaces 61A of the locking hooks 61 and the second locked surfaces 62B are in contact with the second locking surfaces 61B from leftward in FIG. 6 (second locking state).

In the holding plate 30 according to the present embodiment, as shown in FIG. 2 and the like, among the holding units 31, only the second holding unit 231B and the second holding unit 231C are coupled in the first locking state, and the other holding units 31 are all coupled in the second locking state.

As shown in FIG. 2 and the like, between the holding units 31 coupled in the second locking state, or for example, between the second holding units 231A and 231B shown in FIG. 6, the upper surfaces of the holding walls 35 and the bottom walls 37 and 38 are coupled with no gaps therebetween. The lower thin bottom portions 237L and 238L of the second holding units 231 and the lower thin bottom portions 337L and 338L of the third holding unit 331 are set so as to overlap exactly with the upper thin bottom portions 137U and 138U of the first holding unit 131 and the upper thin bottom portions 237U and 238U of the second holding units 231.

In contrast to this, the second holding units 231B and 231C coupled in the first locking state are coupled in a state in which a gap with a predetermined length S2 in the X-axis direction is maintained at the upper surfaces of the groove wall 35 and the bottom walls 37 and 38. That is, the slide length in the second stage, or in other words, the interval between the first locking surface 61A and the second locking surface 61B, or in yet other words, the interval between the first locked surface 62A and the second locked surface 62B, is set to the predetermined length S2 (see FIG. 6). Also, the predetermined length S2 is set so as to be approximately equal to the thickness D2 in the X-axis direction of the reinforcing plate X inserted in the single battery group 10 (see FIGS. 1 and 2). Here, as shown in FIG. 3 and the like as well, the length in the X-axis direction of the lower thin bottom portions 237L, 238L, 337L, and 338L is set to be longer than the predetermined length S2, the lower thin bottom portions 238L and 237L are arranged on the bottom surfaces of the wire storing grooves 50 and the like between the second holding units 231B and 231C coupled in the second locking state, and in the regions excluding the holding regions 40, the upper surfaces of the single batteries 11 are prevented from being exposed from the holding plate 30.

The bus bars 21 are formed by press-working approximately rectangular plate materials composed of a metal such as copper, a copper alloy, stainless steel, and aluminum. The surfaces of the bus bars 21 may also be plated with a metal such as tin, nickel, or the like. As shown in FIG. 6 and the like, the bus bars 21 each have a shape obtained by chamfering the four corner portions, and thus can be smoothly inserted into the holding portions 140, 240, and 340 of the holding units 31.

The bus bar 21 is held such that its lengthwise direction conforms to the X-axis direction. The length in the lengthwise direction of the bus bar 21 is set according to the interval between the electrode posts 13 of the adjacent single batteries 11.

In the single battery group 10 according to the present embodiment, as shown in FIG. 1, the reinforcing plate X is inserted between the single battery 11A and the single battery 11B, and therefore among the intervals between the electrode posts 13 of the adjacent single batteries 11, only the interval between the electrode post 13 of the single battery 11A and the electrode post 13 of the single battery 11B is larger than the other intervals by the thickness D2 in the X-axis direction of the reinforcing plate. Accordingly, among the bus bars 21, only the bus bar 21 held in the holding portion 240F on the front side in the second holding unit 231B arranged spanning over the single battery 11A and the single battery 11B is a long bus bar 221 that is formed such that its length in the lengthwise direction is longer than that of the other bus bars 21. Hereinafter, the relatively short bus bars 21 other than the long bus bar 221 will be denoted as "general-purpose bus bars 121".

As shown in FIG. 6 and the like, in the general-purpose bus bars 121, pairs of recessed portions 124 cut out in rectangular shapes are formed in the approximate centers on the front and rear edges extending in the X-axis direction. The positioning protrusions 42 formed on the holding portions 140, 240, and 340 of the holding units 31 are locked in the recessed portions 124. Pairs of through holes 123 in the form of circular holes into which the electrode posts 13 of the electrode terminals 12 of the single batteries 11 are to be inserted are formed so as to be approximately equidistant from the recessed portions 124. The general-purpose bus bars 121 are held such that their right edges approach the left edges of the intermediate protrusions 44 at the proper positions at which the positioning protrusions 42 are locked in the recessed portions 124. Also, setting is performed such that if a holding unit 31 that holds a general-purpose bus bar 121 and a holding unit 31 adjacent on the left side thereto are coupled in the above-described second locking state, the left edge of the general-purpose bus bar 121 approaches the right edge of the intermediate protrusion 44 of the holding unit 31 on the left side.

As shown similarly in FIG. 6 and the like, the length in the lengthwise direction of the long bus bar 221 held in the holding portion 240F on the front side of the second holding unit 231B is formed so as to be longer than that of a general-purpose bus bar 121 by a length that is approximately equal to the width in the X-axis direction of the intermediate protrusion 44 of the holding units 31. This extended portion is an extended portion 225. A pair of recessed portions 224 that are cut out in rectangular shapes are formed in the approximate center on the front edge and the rear edge, excluding the extended portion 225 of the long bus bar 221. The positioning protrusions 42 are locked in the recessed portions 224. The through hole 223 on the right side of the pair of through holes 223 formed so as to be aligned in the left-right direction on the plate surface of the long bus bar 221 is arranged on the right side with respect to the position corresponding to the through hole 123 on the right side of the general-purpose bus bar 121, so as to be aligned between the electrode posts 13 of the single batteries 11A and 11B. The long bus bar 221 is held such that its right edge approaches the right edges of the intermediate protrusions 44 at the proper position at which the recessed portions 224 correspond to the positioning protrusions 42. The extended portion 225 is formed such that the length in the Z-axis direction is shorter than that of other portions, has fitting protruding portions 226 on its front edge and rear edge, and is held in a state in which the fitting protruding portions 226 are fit into approximately U-shaped groove portions in the opposing pair of intermediate protrusions 44.

Method for Attaching Battery Wiring Module 20

Next, an example of a method for attaching the battery wiring module 20 will be described. The method for attaching the battery wiring module 20 is not limited to the following description.

First, the bus bars 21 are attached to the holding units 31. In the present embodiment, the long bus bar 221 is attached to the holding portion 240F on the front side of the second holding unit 231C arranged so as to span over the single battery 11A and the single battery 11B, and the general-purpose bus bars 121 are attached to the other holding units 140, 240, and 340.

The long bus bar 221 and the general-purpose bus bars 121 are all inserted from above into the holding portions 140, 240, and 340 of the holding units 31. As shown in FIG. 6 and the like, the lengths in the Z-axis direction of the long bus bar 221 and the general-purpose bus bars 121 are all lengths that exactly fit in the holding portions 140, 240, and 340, and therefore movement in the Z-axis direction of the bus bars 21 is restricted by the holding walls 133, 233, and 333 and the boundary walls 134, 234, and 334.

The general-purpose bus bars 121 are inserted into the holding portions 140, 240, and 340 while their right edges are made to conform to the right-side surfaces of the intermediate protrusions 44. The general-purpose bus bars 121 are pressed along the inclination of the upper surface of the pressing protrusions 43 provided so as to protrude from the holding walls 33 and the boundary walls 34, fit below the pressing protrusions 43, and are locked between the mounting portions 41 and the pressing protrusions 43, whereby movement in the Y-axis direction of the insertion direction is restricted. At the same time, movement in the X-axis direction of the general-purpose bus bars 121 is restricted due to the positioning protrusions 42 being locked in the recessed portions 124.

The long bus bar 221 is inserted into the holding portion 240F while the fitting protruding portion 226 is aligned with the groove of the intermediate protrusion 44. Similarly to the general-purpose bus bars 121, the inserted long bus bar 221 is pressed along the inclination of the upper surface of the pressing protrusion 43 to fit below the pressing protrusion 43, and is locked between the mounting portion 41 and the pressing protrusion 43 such that movement in the Y direction of the insertion direction is restricted. In addition, fitting protrusion portions 226 are fit into the groove portions of the intermediate protrusions 44 and the positioning protrusions 42 are locked in the recessed portions 224, whereby movement in the X-axis direction of the long bus bar 221 is restricted.

Next, the adjacent holding units 31 are coupled. As described above, when the locked hooks 62 lock between the thick portions 63 and the locking hooks 61 to couple the holding units 31, the holding portions 140, 240, and 340 and the wire storing portions 150, 250, and 350 respectively become continuous, thus forming the holding regions 40 and the wire storing grooves 50.

According to necessity, voltage detection terminals or the like are fit on the bus bars 21 held in the holding regions 40, the wires connected thereto are pulled out from the cut-out portions of the boundary walls 34 and stored in the wire storing grooves 50, and are guided to the exterior from the end portions in the X-axis direction of the holding plate 30.

The bus bars 21 held in the holding regions 40 are held in a state of not being in contact with each other. In other words, as shown in FIG. 6 and the like, intervals corresponding to the width in the X-axis direction of the intermediate protrusions 44 of the holding walls 33 and the boundary walls 34 are ensured between the general-purpose bus bars 121. Also, since the interval corresponding to the predetermined length S2 is ensured between the long bus bar 221 held in the second holding unit 231B and the general-purpose bus bar 121 held in the adjacent second holding unit 231C, the bus bars 21 do not come into contact.

Since the side wall portions 136 and 336 are arranged on both end portions in the X-axis direction of the holding region 40, the insulation state between the bus bars 21 arranged on the end portion and an external member is maintained.

Next, the battery wiring module 20 is attached to the single battery group 10.

The single batteries 11 are arranged in the X-axis direction such that the electrode terminals 12 of adjacent single batteries 11 are different, and the reinforcing plate X is arranged between the single batteries 11A and 11B, whereby the single battery group 10 is manufactured. The battery wiring module 20 is attached along the Y-axis direction from above the single battery group 10. Specifically, the electrode terminals 12 (electrode posts 13) of the single batteries 11 are inserted through the through holes 123 of the general-purpose bus bars 121, the through holes 223 of the long bus bar 221, and if needed, the through holes of the voltage detection terminals or the like adjacent to the through holes 123 and 223.

When the holding plate 30 formed by coupling the holding units 31 is carried, it is preferable to use a jig including a plate surface that supports the bottom walls 37 and 38 from the lower side, and a side surface that supports the coupling walls 32F and 32R from the outer side surface. It is possible to suppress the force acting in the Y-axis direction on the coupling portions of the holding plates 30 and to suppress a situation in which the coupling is undone. Furthermore, it is preferable to form a protruding portion that protrudes inward at a position corresponding to the coupling wall 32 portion that is coupled in a first coupling state and to interpose the protruding portion between the level difference portion of the locked hook 62 and the right edge of the thick portion 63, since a situation in which a force that presses the locked hook 62 coupled in the first coupling state acts is suppressed, and the gap of the predetermined length S2 that is formed between the second holding units 231B and 231C can be reliably maintained.

In the holding units 31, the bus bars 21 are held in a state in which movement in the Y-axis direction is restricted with respect to the holding portions 140, 240, and 340 by the pressing protrusions 43, and therefore even if the electrode posts 13 of the single batteries 11 and the upper surfaces thereof (electrode forming surfaces) collide with the battery wiring module 20, the bus bars 21 are less likely to protrude upward, and work can be advanced smoothly.

The bus bars 21 are arranged such that the electrode posts 13 are inserted into the through holes 123 and 223 and come into contact with the pedestals of the electrode terminals 12, and the bus bars 21 are fixed using fixing members (not shown). When the electrode posts 13 and the bus bars 21 finish being fixed, the single battery group 10 can be electrically connected, and the battery module M1 is complete.

Actions and Effects of the Present Embodiment

Hereinafter, actions and effects of the present embodiment will be described.

According to the above-described battery wiring module 20, the holding units 31 can be coupled in different coupling states, such as a first locking state and a second locking state. As described above, in the first locking state, coupling can be performed such that the interval between the holding units 31 is a predetermined length S2 larger than in the second locking state. In this manner, the interval between the holding units 31 can be changed by changing the locking surface (locking portion) and the locked surface (locked portion) that contribute to the coupling of the holding units 31, and therefore when connecting the single batteries 11A and 11B, in which the interval between the adjacent single batteries 11 in the single battery group 10 is significantly different from the other intervals, the second holding unit 231B, which has the same structure as the other second holding units 231A, 231C, and 231D can be used.

As a result, the second holding units 231 can be used in common, and it is possible to suppress the cost of the battery wiring module 20 to be attached to the single battery group 10 having locations at which the interval between the electrode posts 13 is different. Also, since it is easier to handle a change in the interval between the single batteries 11, the degree of freedom in the design of the single battery group 10, and consequently, the power storage module M1, is particularly increased.

In the above-described battery wiring module 20, the first locking surfaces 61A and the second locking surfaces 61B are provided in alignment in the X-axis direction (first direction) and the first locked surfaces 62A and the second locked surfaces 62B are provided in alignment in the X-axis direction. Accordingly, among the first locked surfaces 62A and the second locked surfaces 62B, only the first locked surfaces 62A are locked to the second locking surfaces 61B of the locking hooks 61 (first locking state), or the first locked surfaces 62A are locked to the first locking surfaces 61A and the second locked surfaces 62B are locked to the second locking surfaces 61B (second locking state), and thus it is possible to adjust the intervals between the holding units 31.

In the battery wiring module 20, the locked hooks 62 including the first locked surfaces 62A and the second locked surfaces 62B can be locked to the locking hooks 61 including the first locking surfaces 61A and the second locking surfaces 61B by sliding in the X-axis direction (first direction). Accordingly, by merely changing the sliding width of the locked hooks 62 on the locking hooks 61 when the holding units 31 are coupled, the first locking surfaces 61A and second locking surfaces 61B (locking portions), and the first locked surfaces 62A and second locked surfaces 62B (locked portions), which are used to couple the holding units 31, can be changed.

As a result, the coupling widths of the holding units 31 can be adjusted in a stepwise manner very easily according to the intervals between the electrode posts 13 of the adjacent single batteries 11, and it is easy to manufacture various battery wiring modules 20, and consequently, to manufacture the battery module M1.

Second Embodiment

A second embodiment will be described with reference to FIGS. 7 to 13.

Figure 7:
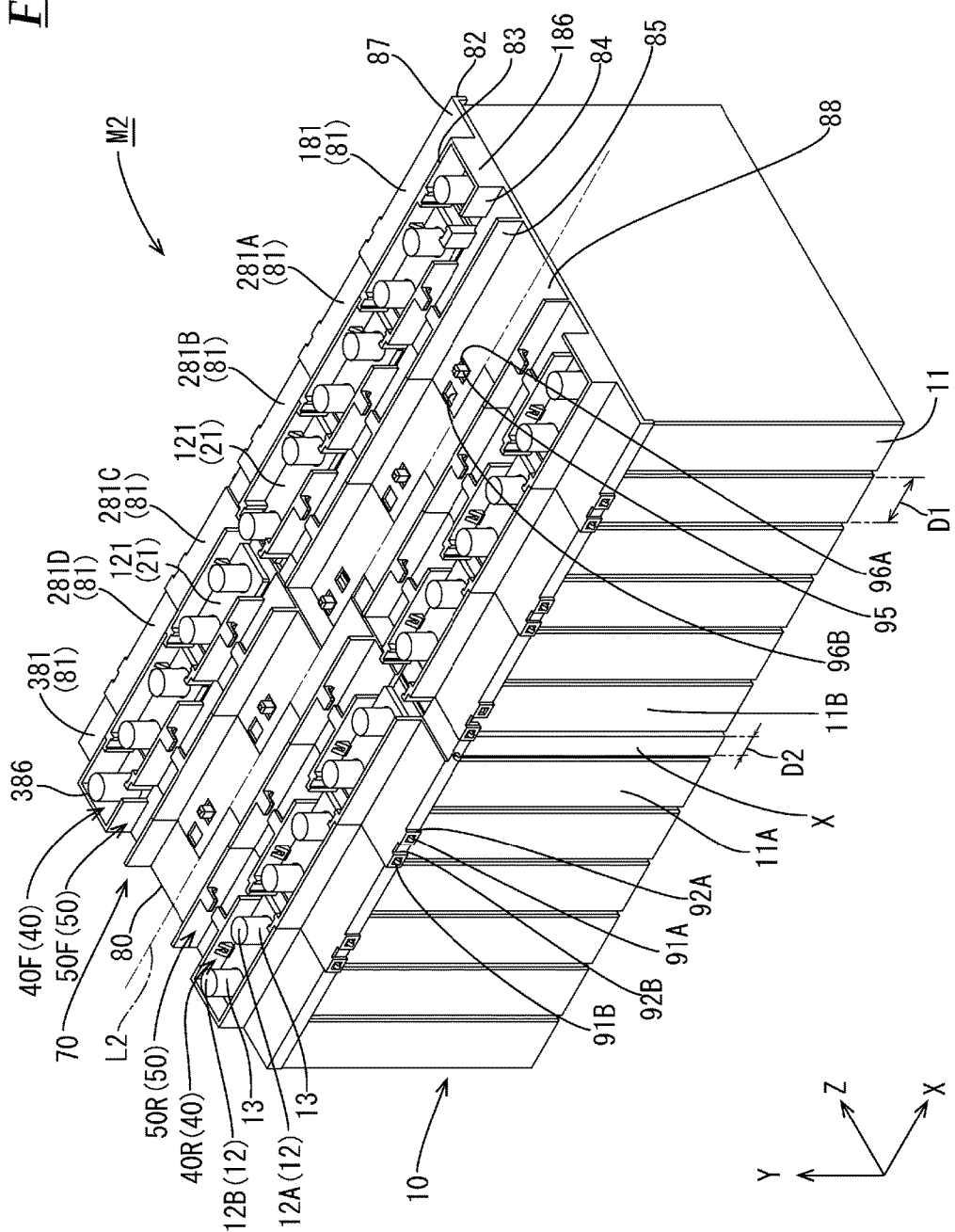
FIG. 7 is a diagram showing an external view of a battery module according to a second embodiment.

As shown in FIG. 7, the battery wiring module 70 according to the present embodiment is attached to a single battery group 10 that is the same as that of the first embodiment, and thus a battery module M2 is formed. Note that upon referencing FIG. 1, which shows the battery module M1 according to the first embodiment, FIG. 7 is a diagram showing a view of the battery module M2 from the rear side (far side on the left) of FIG. 1. Hereinafter, in accordance with the first embodiment, the near side on the right in FIG. 7 is set as the left (the far side on the left is set as the right), the upper side is set as up (the lower side is set as down), the near side on the left is set as the rear (the far side on the right is set as the front), the left-right direction is the X-axis direction, the vertical direction is the Y-axis direction, the front-rear direction is the Z-axis direction, and the direction lines are indicated in the drawings.

Upon comparing the battery wiring module 70 according to the present embodiment with the battery wiring module 20 according to the first embodiment, only the structure for coupling holding units 81 of the holding plate 80 that forms the battery wiring module 70 is different. Hereinafter, configurations that are similar to those of the first embodiment are denoted by identical reference signs, and description thereof is omitted. Note that in the present embodiment as well, the X-axis direction is the first direction, and the Y-axis direction is the second direction.

The battery wiring module 70 according to the present embodiment includes multiple bus bars 21 that are connected to the electrode terminals 12 of the single batteries 11, and a holding plate 80 that is made of synthetic resin and holds the bus bars 21. As shown in FIG. 7, the center line extending in the X-axis direction of the holding plate 80, which has a rectangular shape in a top view, is the axis L2, and in the following description, if necessary, the suffix "F" is attached to the reference numerals of elements arranged frontward with respect to the axis L2, and the suffix "R" is attached to the reference numerals of elements arranged rearward with respect to the axis L2, and when these elements are referred to collectively with no distinction made therebetween, the suffixes are not used.

Figure 8:
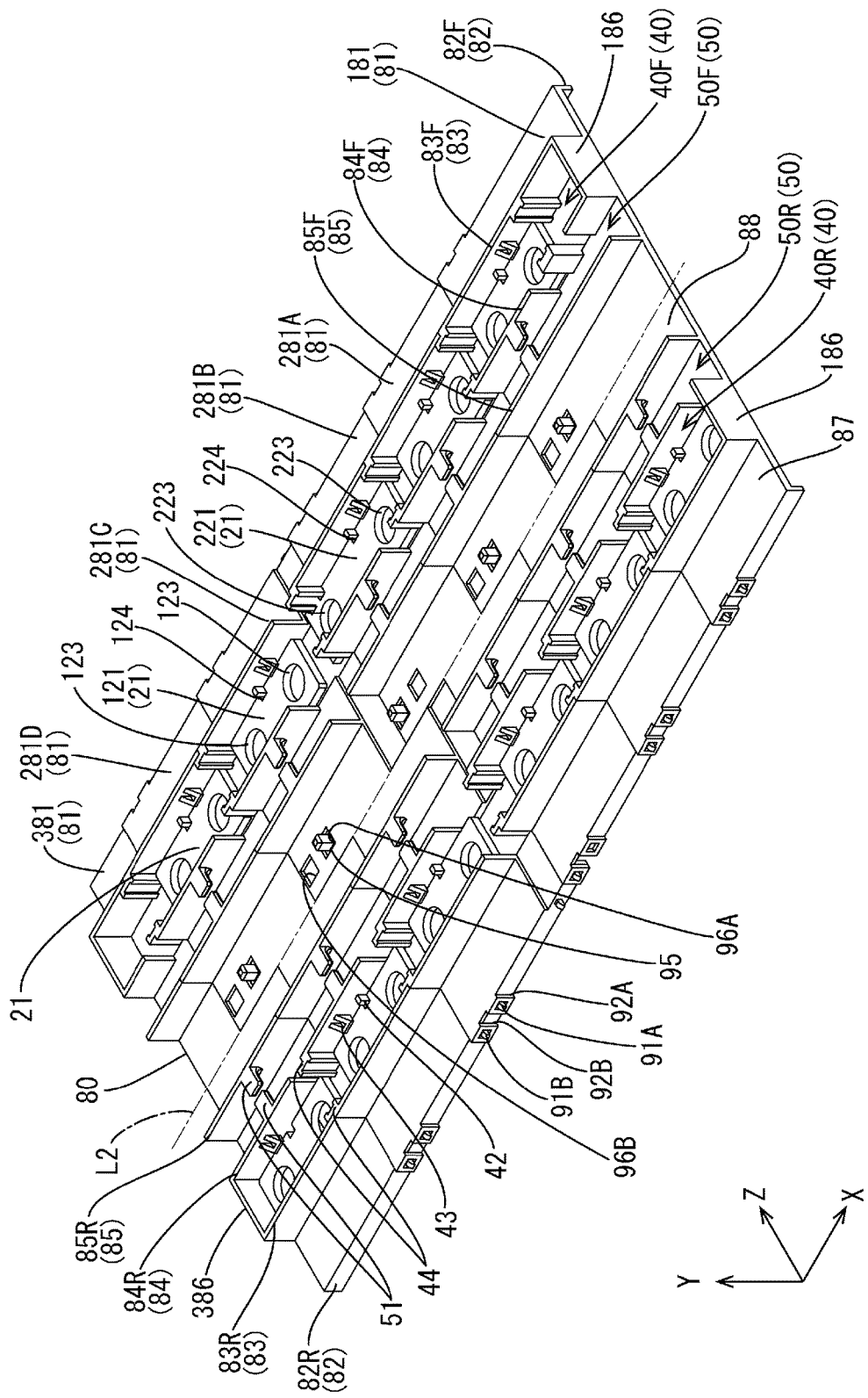
FIG. 8 is a perspective view of a holding plate in which connection members are arranged.

As shown in FIG. 8, the holding plate 80 is composed of multiple (in the present embodiment, six) holding units 81 that are aligned in the X-axis direction and are coupled together, or in other words, a first holding unit 181 arranged on the left end, a third holding unit 381 arranged on the right end, and four second holding units 281 arranged between the two. Holding walls 83, boundary walls 84, and groove walls 85 are arranged extending along the X-axis direction on the upper surface of the holding plate 80, in the stated order heading toward the axis L2 from the front edge and the rear edge. Also, hanging walls 82 are formed in a downward orientation from the front edge and the rear edge of the holding plate 80.

The first holding unit 181, the second holding units 281, and the third holding unit 381 differ only in the structures for coupling, compared to the first holding unit 131, the second holding units 231, and the third holding unit 331 according to the first embodiment, and since the structures for coupling are similar in the first holding unit 181, the second holding units 281, and the third holding unit 381, mainly the structures for coupling the second holding units 281 will be described hereinafter and detailed description of the other configurations is omitted.

Figure 9:
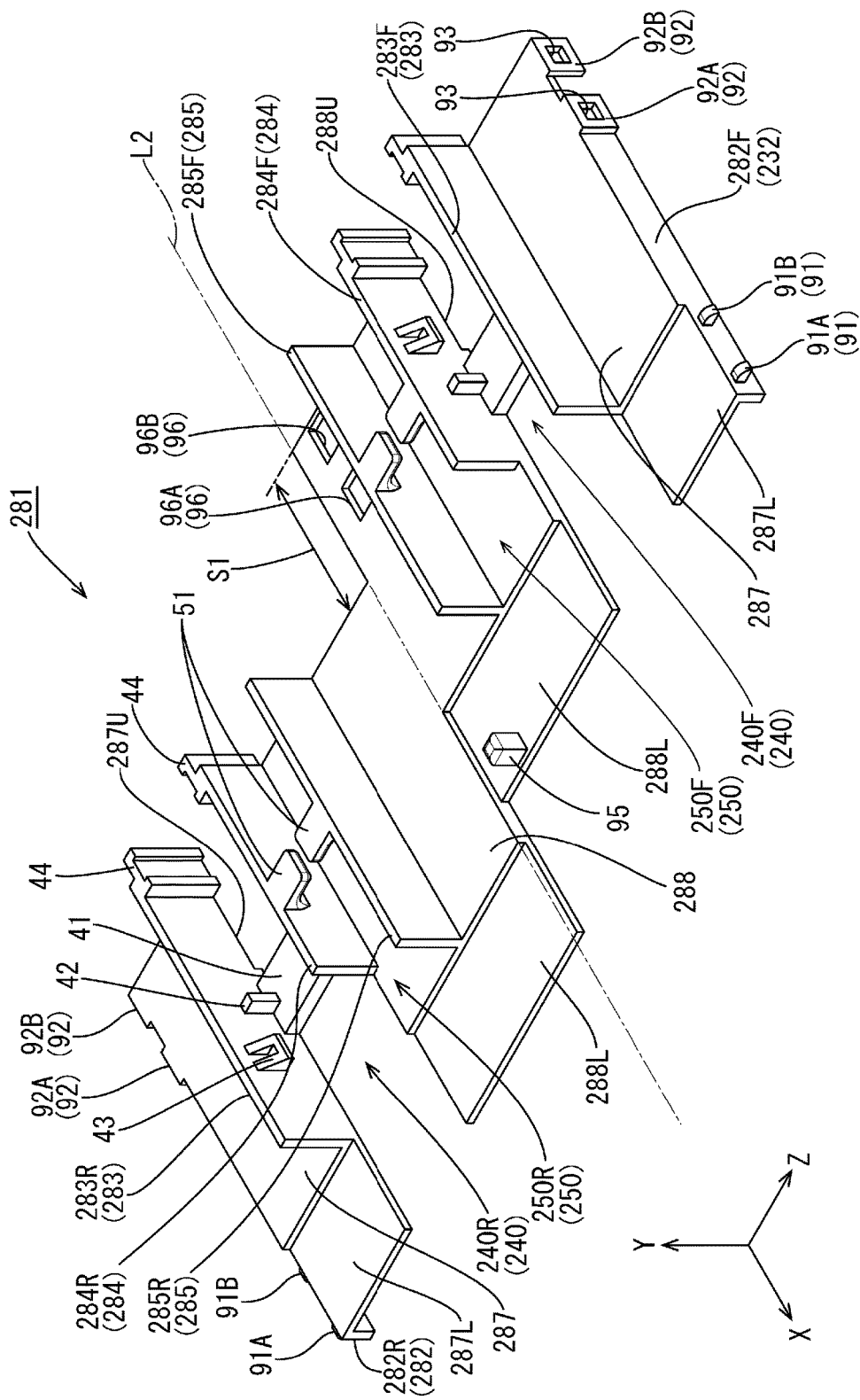
FIG. 9 is a perspective view of a second holding unit.

In the holding plate 80, the four second holding units 281 coupled in alignment in the central portion in the X-axis direction have the structure shown in FIG. 9. Note that in the following description, if it is necessary to make a distinction between the four second holding units 281, second holding units 281A, 281B, 281C, and 281D are used in the stated order starting from the left.

As shown in FIG. 9, hanging walls 282 that hang downward are formed from the front edge and the rear edge of the second holding units 281. Also, holding wall portions 283, boundary wall portions 284, and groove wall portions 285 are formed on the upper surfaces of the second holding units 281. As shown in FIG. 8, in the state in which the holding units 81 are coupled, the hanging wall portions 282, the holding wall portions 283, the boundary wall portions 284, and the groove wall portions 285 are continuous and form parts of the hanging walls 82, the holding walls 83, the boundary walls 84, and the groove walls 85.

The second holding units 281 include bottom walls 287 and 288 that correspond to the bottom wall portions 237 and 238 of the second holding units 231 of the first embodiment, upper thin bottom portions 287U and 288U are formed on the right end portions, and lower thin bottom portions 287L and 288L are formed on the left end portions. In the state in which the holding units 81 are coupled, the upper thin bottom portions 287U and 288U overlap with the lower thin bottom portions 287L and 288L and the like and form parts of the bottom walls 87 and 88.

Figure 10:
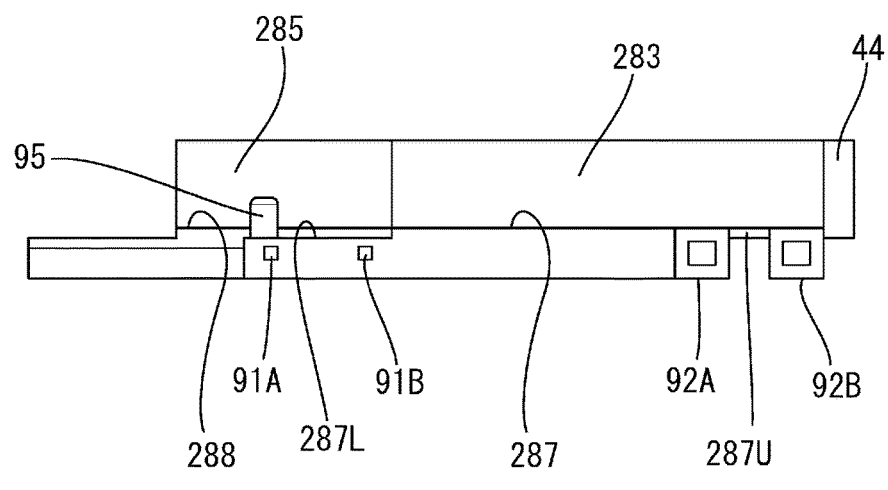
FIG. 10 is a front-side view of a second holding unit.
Figure 11:
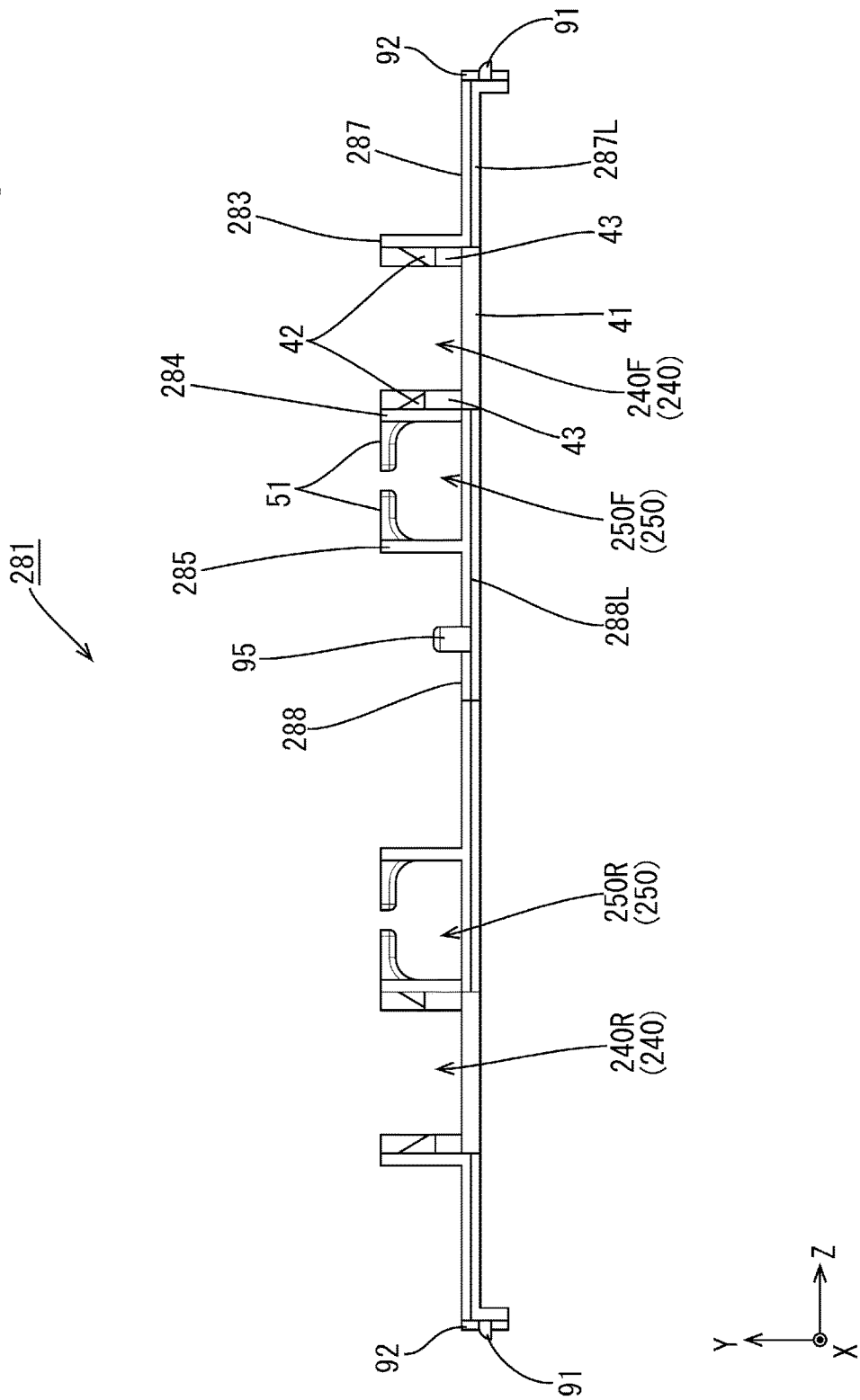
FIG. 11 is a left-side view of a second holding unit.
Figure 13:
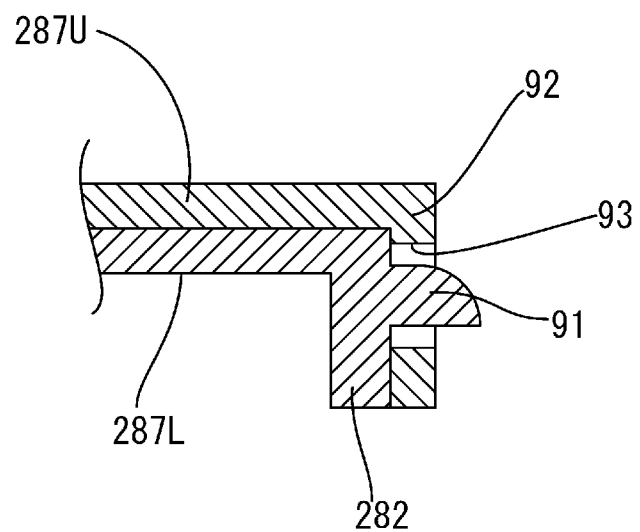
FIG. 13 is an enlarged vertical cross-sectional view showing a locked state of a locking protrusion and a locking piece.

Two engagement protrusion portions 91 (engagement portions) are provided in alignment in a protruding manner with a gap therebetween in the X-axis direction, on the left side of the hanging wall portion 282 and frontward of the lower thin bottom portion 287L. As shown in FIG. 10, the engagement protruding portions 91 each have an approximately square shape in front view, and as shown in FIGS. 11 and 13, the upper surfaces thereof are formed so as to have downward-bent surfaces that face the protrusion end portions in a side view. Among the locking protrusion portions 91, a first locking protrusion portion 91A is toward the left, and a second locking protrusion portion 91B is toward the right.

On the right side of the hanging wall portion 282 and frontward of the upper thin bottom portion 287U, locking pieces 92 (locked portions) that have locking holes 93 that are approximately square-shaped are formed so as to be aligned in the X-axis direction. As shown in FIGS. 10 and 13, the locking holes 93 are formed a little larger than the locking protrusion portions 91, and thus the locking protrusion portions 91 can be locked with a slight clearance. Among the locking pieces 92, a first locking piece 92A is toward the left, and a second locking piece 92B is toward the right. As shown in FIGS. 11 and 13, the locking pieces 92 are provided so as to be able to conform to the outer surfaces of the hanging wall portions 282 on their inner surfaces, and so as to protrude slightly outward with respect to the hanging wall portion 282. Also, as shown in FIG. 9 and the like, the lower edge and left side edge of the first locking piece 92A and the lower edge and both left and right edges of the second locking piece 92B are free ends.

On a lower thin bottom portion 288L, at a position toward the left on the axis L2 side with respect to the wire storing portion 250F on the front side, one rectangular prism-shaped coupling protrusion 95 is provided in a standing manner. In order to correspond to this, on an upper thin bottom portion 288U, two square-shaped coupling holes 96 are formed at positions toward the right on the axis L2 side with respect to the wire storing portion 250F on the front side. Among the coupling holes 96, a first coupling hole 96A is on the left side and a second coupling hole 96B is on the right side. The coupling holes 96 are square-shaped open holes that are formed a little larger than the horizontal cross-section of the coupling protrusion 95. As shown in FIG. 10, the lower thin bottom portion 287L on which the coupling protrusion 95 is provided in a standing manner and the upper thin bottom portion 287U on which the coupling holes 96 are formed are formed so as to have the same thickness as other parts of the bottom wall portions 287 in the overlapping state.

Although a detailed description is omitted, the first holding unit 181 and the third holding unit 381 according to the present embodiment respectively have outlines that are similar to those of the first holding unit 131 and the third holding unit 331 of the first embodiment, have bottom wall portions 187, 188, 387, and 388 that correspond to the bottom wall portions 137, 138, 337, and 338, and on the upper surface thereof, holding wall portions 183 and 383, boundary wall portions 184 and 384, groove wall portions 185 and 385, and side wall portions 186 and 386, which correspond to the holding wall portions 133 and 333, boundary wall portions 134 and 334, and groove wall portions 135 and 335, are formed. Also, similarly to the second holding unit 281, hanging wall portions 182 and 382 are hung from the front edge and rear edge.

The coupling structures of the holding units 81, which constitute the holding plate 80 according to the present embodiment will be described.

As shown in FIG. 8 and the like, on the right end portions of the hanging wall portions 182 of the first holding unit 181, similarly to the hanging wall portions 282 of the above-described second holding units 281, two locking pieces (first locking piece 92A, second locking piece 92B) (locked portions) are provided in alignment in the X-axis direction. Also, similarly to the hanging wall portions 282 of the above-described second holding unit 281, two locking protrusion portions (first locking protrusion portion 91A, second locking protrusion portion 91B) (locking portions) are similarly provided in alignment in the X-axis direction on the left end portions of the hanging wall portions 382 of the third holding unit 381.

Furthermore, similarly to the upper thin bottom portions 288U of the second holding units 281, two coupling holes 96A and 96B (locked portions) are formed in alignment in the X-axis direction from an upper thin bottom portion 188U of the first holding unit 181. Also, similarly to the lower thin bottom portions 288L of the above-described second holding unit 281, a coupling protrusion 95 (locking portion) is provided in a standing manner from a lower thin bottom portion 388L of the third holding unit 382.

In order to couple the holding units 81, the holding unit 81 that is to be adjacent on the left side is positioned with respect to the holding unit 81 while being pressed and fit from above along the Y-axis direction.

With the holding plate 80 according to the present embodiment, as shown in FIG. 8 and the like, only the second holding units 281B and 281C are coupled in a locking state different from that of the other holding units 81. The locking state between the second holding units 281B and 281C is a first locking state, and the locking state between the other holding units 81 is a second locking state. Note that a long bus bar 221 is held only in the holding portion 240F on the front side of the second holding unit 281B, and general-purpose bus bars 121 are held in the other holding portions 140, 240, and 340.

Figure 12:
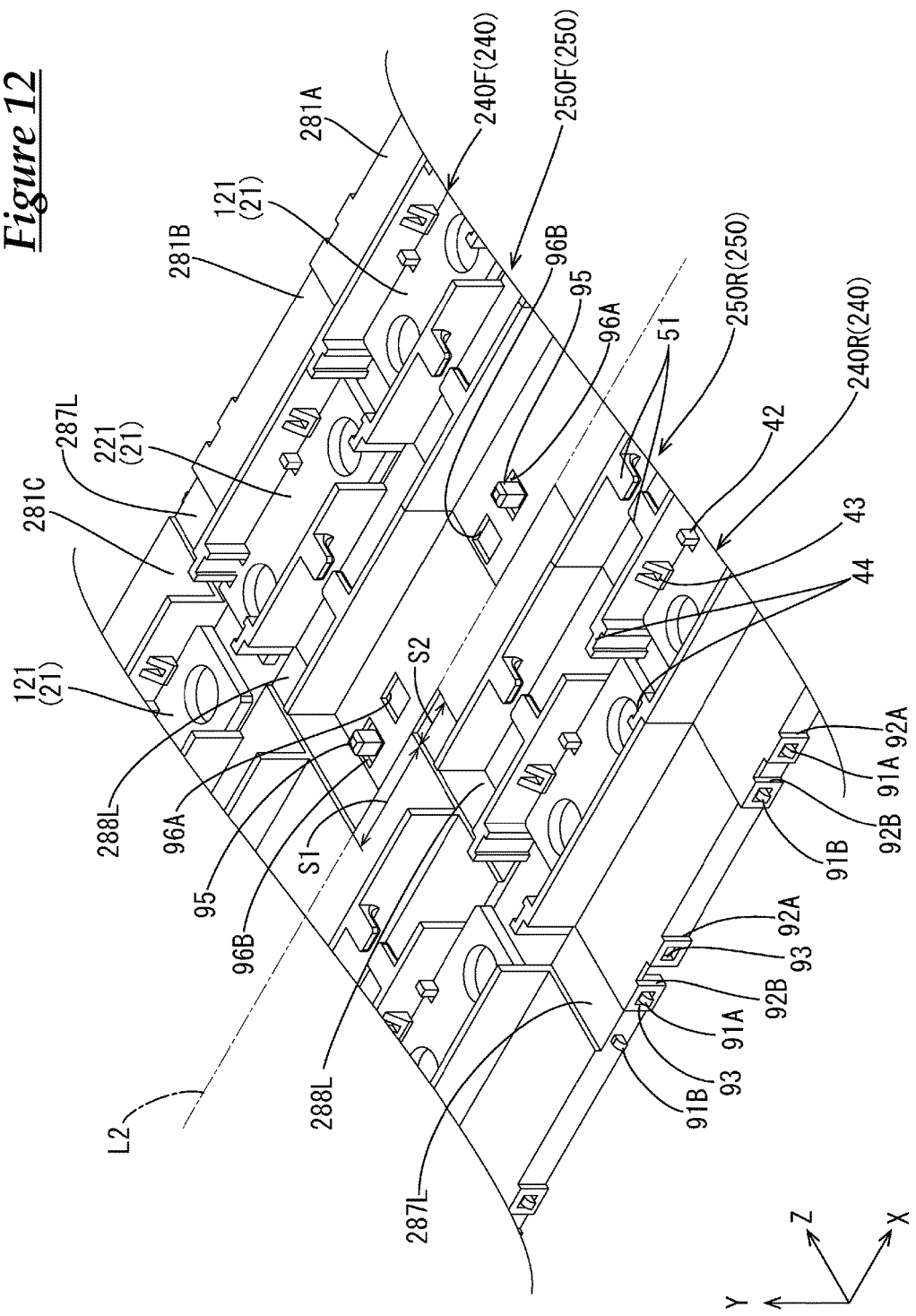
FIG. 12 is an enlarged perspective view of coupling portions of the holding plate.

As shown in FIG. 12, in order to couple the second holding units 281B and 281C, the second holding unit 281B is placed from above the second holding unit 281C while the second locking piece 92B of the second holding unit 281B is aligned with the first locking protrusion portion 91A of the second holding unit 281C. When pressed in the Y-axis direction, the lower ends of the second locking pieces 92B come into contact with the upper surfaces of the first locking protrusion portions 91A and deform by bending outward. When the second holding unit 281B is further pressed and fit onto the second holding unit 281C while the second locking pieces 92B are deformed by bending, the entireties of the first locking protrusion portions 91A fit into the locking holes 93 of the second locking pieces 92B, and the deformation of the second locking pieces 92B is reverted. By fitting the first locking protrusion portions 91A into the locking holes 93 while leaving some clearance, the second locking pieces 92B are locked on the first locking protrusion portions 91A, significant movement in the X-axis direction and Y-axis direction is restricted, and the second holding unit 281B and the second holding unit 281C are coupled. At the same time, the coupling protrusion 95 is locked in the first coupling hole 96A while similarly leaving some clearance, and significant movement in the X-axis direction and the Z-axis direction are restricted.

The second holding units 281B and 281C coupled in the first locking state are coupled in a state in which a gap with a predetermined length S2 is maintained at the upper surfaces of the groove wall 85 and the bottom walls 87 and 88. The length in the X-axis direction of the lower thin bottom portion 287L, 288L, 387L, and 388L is set to be longer than the predetermined length S2 as shown in FIG. 9 and the like as well, the lower thin bottom portions 288L and 287L are arranged on the bottom surfaces of the wire storing grooves 50 and the like between the second holding units 281B and 281C coupled in the first locking state, and the upper surface of the single battery group 10 is not exposed from the holding plate 80 in the region excluding the holding region 40.

In the holding plate 80 according to the present embodiment, the above-described other holding units 81 are coupled in the second locking state. As an example, coupling of the second holding unit 281B shown in FIG. 12 and the second holding unit 281A arranged on the left side thereof will be described.

First, the second locking pieces 92B of the second holding unit 281A are aligned with the second locking protrusion portions 91B of the second holding unit 281B, and the second locking pieces 92B of the second holding unit 281A are aligned with the second locking protrusion portion 91B of the second holding unit 281B, and when the second holding unit 281A is placed from above the second holding unit 281B, the lower surfaces of the locking pieces 92 come into contact with the upper surfaces of the locking protrusion portions 91 and deform by bending outward. When the locking pieces 92 are deformed by bending and the second holding unit 281A is further pressed and fit onto the second holding unit 281B, the entireties of the locking protrusion portions 91 fit into the locking holes 93 of the locking pieces 92 and the deformation of the locking pieces 92 is reverted. The locking protrusion portions 91 are fit into the locking holes 93 while leaving some clearance, the locking pieces 92 are locked to the locking protrusion portions 91, and thus coupling is performed while significant movement in the X-axis direction and the Y-axis direction is restricted. At the same time, the coupling protrusion 95 is locked in the first coupling hole 96A while similarly leaving some clearance, and significant movement in the X-axis direction and the Z-axis direction is restricted.

The holding units 81 coupled in the second locking state, or for example, the second holding units 231A and 231B, are coupled with no gaps at the upper surfaces of the groove walls 85 and the bottom walls 87 and 88. That is, the first locking protrusion portion 91B is provided at a position shifted by approximately the predetermined length S2 in the X-axis direction with respect to the second locking protrusion portion 91A, the second locking piece 92B is provided at a position shifted by approximately the predetermined length S2 in the X-axis direction with respect to the first locking piece 92A, and the second coupling hole 96B is provided at a position shifted by approximately the predetermined length S2 in the X-axis direction with respect to the first coupling hole 96A. Also, the lower thin bottom portions 287L, 288L, 387L, and 388L are set so as to exactly overlap with the upper thin bottom portions 187U, 188U, 287U, and 288U.

Actions and Effects of the Present Embodiment

Hereinafter, actions and effects of the present embodiment will be described.

According to the above-described battery wiring module 70, the holding units 81 can be coupled in different coupling states, such as a first locking state and a second locking state. As described above, in the first locking state, coupling is performed such that the interval between the holding units 81 is a predetermined length S2 larger than in the second locking state. In this manner, by changing the locking protrusion portions (locking portions) and the locking pieces (locked portions) that are used to couple the holding units 31, the intervals between the holding units 31 can be changed, and therefore a second holding unit 281B having the same structure as the other second holding units 281A, 281C, and 281D can be used as the second holding unit 281B that connects the single batteries 11A and 11B at which the interval between the adjacent single batteries 11 in the single battery group 10 is significantly different from the others.

As a result, the second holding units 281 can be used in common, and it is possible to suppress the cost of the battery wiring module 20 to be attached to the single battery group 10 having a location at which the interval between the adjacent electrode posts 13 is different. Also, since it is easier to handle a change in the interval between the single batteries 11, the degree of freedom in the design of the single battery group 10, and consequently, the battery module M1, is greatly increased.

In the above-described battery wiring module 70, the locking protrusion portion 91 is fit into the locking hole 93 and the coupling protrusion 95 is fit into the coupling hole 96, each with some clearance left, and therefore some relative movement in the X-axis direction is possible.

As a result, even if minute shifts occur in the pitch between the electrode posts 13 of the single batteries 11 due to an attachment allowance, shifts in the pitch can be adjusted due to the holding units 81 relatively moving in the X-axis direction.

In the above-described battery wiring module 70, with the holding units 81, the locking protrusion portions 91 of one holding unit 81 can lock into the locking holes 93 of another holding unit 81 and the coupling protrusion 95 of the one holding unit 81 can lock into the coupling hole 96 of the other holding unit 81 due to the other holding unit 81 being pressed onto the one holding unit 81 from above along the Y-axis direction (second direction). Here, the locking state is changed by appropriately performing positioning during pressing, and a holding plate 80 that is coupled with a desired coupling width can be manufactured.

As a result, even if the work space is small and there is no room to slide the holding units 81 relative to each other in the X-axis direction (first direction), the coupling width of the holding units 81 can be easily adjusted. Also, the wiring module in which the holding units 81 are coupled with an appropriate interval can also be manufactured on-site and attached to the single battery group 10 installed in a predetermined location.

Other Embodiments

The present invention is not limited to the embodiments described through the above description and drawings, and for example, the following embodiments are also encompassed in the technical scope of the present invention.

The number of holding units 31 and 81 that constitute the battery wiring modules 20 and 70 can be any number that is two or more.

The holding units 31 and 81 that constitute the battery wiring modules 20 and 70 may all have the same shape. For example, the holding units 31 and 81 may have shapes that are completely symmetrical with respect to the axis L1 or the like, and the bus bars 21 held in the front portions and the bus bars 21 held in the rear portions may connect the electrode posts 13 of the same single batteries 11.

Two or more of the locking portions and locked portions can be included. This makes it possible to obtain battery wiring modules 20 and 70 in which the locking states between the holding units 31 and 81 can be changed in multiple stages without being limited to two stages and electrode posts 13 arranged at various intervals can be connected.

The member interposed between the single batteries 11 is not limited to being the reinforcing member X and can be any member, such as a heat dissipation plate. Also, these members can be arranged at any position in the single battery group 10. Multiple types of members may be interposed in one single battery group 10.

It is also possible to use a configuration in which bus bars 21 are reliably held in an insulated state by providing insulating hanging walls that hold the insulated state between adjacent bus bars 21 or arranging another insulating member in the holding regions 40 of the battery wiring modules 20 and 70.

The holding regions 40 of the battery wiring modules 20 and 70 may have a configuration in which the bus bars 21 and the like can be inserted horizontally therein.

Lid portions that openably close the upper surfaces of the holding regions 40 and the like may be provided in the battery wiring modules 20 and 70.

The through holes 23 of the bus bars 21 may be oval-shaped instead of circular. According to this, even if the intervals between the electrode posts 13 shift slightly, they can be dealt with as-is due to the attachment tolerance of the single batteries 11 and the like.

The power storage element is not limited to a single battery 11, and the battery wiring modules 20 and 70 may be attached to a power storage element group in which capacitors are aligned, for example.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

M1, M2 Battery module (power storage module)
10 Single battery group (power storage element group)
11 Single battery (power storage element)
12 Electrode terminal
20, 70 Battery wiring module (wiring module)
21 Bus bar (connection member)
121 General-purpose bus bar
221 Long bus bar
30, 80 Holding plate
31, 81 Holding unit
131, 181 First holding unit
231, 281 Second holding unit
331, 381 Third holding unit
40 Holding region
140, 240, 340 Holding portion
50 Wire storing groove
150, 250, 350 Wire storing portion
61 Locking hook
61A First locking surface (locking portion)
61B Second locking surface (locking portion)
62 Locked hook
62A First locked surface (locked portion)
62B Second locked surface (locked portion)
91 Locking protrusion portion
91A First locking protrusion portion (locking portion)
91B Second locking protrusion portion (locking portion)
92 Locking piece
92A First locking piece (locked portion)
92B Second locking piece (locked portion)
93 Locking hole
95 Coupling protrusion
96 Coupling hole (locking portion)
96A First coupling hole (locked portion)
96B Second coupling hole (locked portion)
X Reinforcing plate

The invention claimed is:

1. A wiring module to be attached to a power storage element group in which a plurality of power storage elements having positive and negative electrode terminals are aligned in a first direction, the wiring module configured to be attached from a second direction orthogonal to the first direction, comprising:
   connection members to be connected to the electrode terminals; and
   a plurality of holding units that are coupled in the first direction and hold the connection members,
   wherein the holding units are each provided with:
   a locking portion that locks and couples a holding unit adjacent to the holding unit, and
   a locked portion that is locked to the locking portion of a holding unit adjacent to the holding unit, and
   a plurality of at least one of the locking portions and the locked portions are provided in alignment in the first direction in the holding unit and are configured such that an interval between the adjacent holding units can be changed in a stepwise manner, wherein the locking portion of the holding unit is configured to lock with the locked portion of an adjacent holding unit at a first set interval of a plurality of set intervals so that a distance taken in the first direction between the holding unit and the adjacent holding unit is kept constant and maintained at a predetermined length that corresponds to the first set interval.

2. The wiring module according to claim 1, wherein the locked portions of the holding units can each be locked to the locking portion of a holding unit adjacent to the holding unit by sliding along the first direction.

3. The wiring module according to claim 1, wherein the locked portions of the holding units can each be locked to the locking portion of a holding unit adjacent to the holding unit by being pressed along the second direction.

4. The wiring module according to claim 1, wherein the interval between the adjacent holding units is configured to be changeable in a stepwise manner by changing at least one of the locking portion and the locked portion used to couple the adjacent holding units.

5. The wiring module according to claim 4, wherein the locked portions of the holding units can each be locked to the locking portion of a holding unit adjacent to the holding unit by sliding along the first direction.

6. The wiring module according to claim 4, wherein the locked portions of the holding units can each be locked to the locking portion of a holding unit adjacent to the holding unit by being pressed along the second direction.

* * * * *